US010174548B2

(12) United States Patent
Graybar

(10) Patent No.: US 10,174,548 B2
(45) Date of Patent: *Jan. 8, 2019

(54) WINDOW COVERING MOTORIZED LIFT AND CONTROL SYSTEM GEAR TRAIN

(71) Applicant: SPRINGS WINDOW FASHIONS, LLC, Middleton, WI (US)

(72) Inventor: Michael Graybar, Madison, WI (US)

(73) Assignee: SPRINGS WINDOW FASHIONS, LLC, Middleton, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/585,977

(22) Filed: May 3, 2017

(65) Prior Publication Data

US 2017/0234066 A1 Aug. 17, 2017

Related U.S. Application Data

(63) Continuation of application No. 14/777,276, filed as application No. PCT/US2014/027330 on Mar. 14, 2014, now Pat. No. 9,657,516.

(Continued)

(51) Int. Cl.
F16H 1/46 (2006.01)
E06B 9/322 (2006.01)
(Continued)

(52) U.S. Cl.
CPC .............. E06B 9/322 (2013.01); E06B 9/42 (2013.01); E06B 9/68 (2013.01); E06B 9/70 (2013.01);
(Continued)

(58) Field of Classification Search
None
See application file for complete search history.

(56) References Cited

U.S. PATENT DOCUMENTS 4,651,940 A 3/1987 Nakamura
4,657,060 A 4/1987 Kaucic
(Continued)

FOREIGN PATENT DOCUMENTS

DE 202006013201 10/2006
DE 102008058098 5/2009
(Continued)

OTHER PUBLICATIONS

PCT/US2014/028234 International Search Report and Written Opinion dated Oct. 10, 2014 (20 pages).
(Continued)

Primary Examiner — Dirk Wright
(74) Attorney, Agent, or Firm — Michael Best & Friedrich LLP

(57) ABSTRACT

A window covering includes a movable window covering material, lift cords for moving the material, a lift cord take-up shaft for gathering and releasing lengths of the lift cords to move the window covering material, and a motorized lift assembly. The motorized lift assembly includes a motor assembly including a motor, a gear train drivingly connected to and operated by the motor, and a driveshaft drivingly connected to the gear train and to the lift cord take-up shaft. The gear train includes a plurality of planetary gear stages.

18 Claims, 24 Drawing Sheets

Related U.S. Application Data

(60) Provisional application No. 61/792,226, filed on Mar. 15, 2013.

(51) Int. Cl.

| | | |
|---|---|---|
| *E06B 9/42* | (2006.01) | |
| *E06B 9/68* | (2006.01) | |
| *E06B 9/70* | (2006.01) | |
| *G05B 15/02* | (2006.01) | |
| *E06B 9/72* | (2006.01) | |
| *F16H 57/08* | (2006.01) | |
| *H02K 11/215* | (2016.01) | |

(52) U.S. Cl.
CPC ............... *E06B 9/72* (2013.01); *F16H 1/46* (2013.01); *F16H 57/082* (2013.01); *G05B 15/02* (2013.01); *H02K 11/215* (2016.01); *E06B 2009/3222* (2013.01); *E06B 2009/6827* (2013.01); *E06B 2009/6836* (2013.01); *E06B 2009/6845* (2013.01); *E06B 2009/725* (2013.01)

(56) References Cited

U.S. PATENT DOCUMENTS

| | | | | |
|---|---|---|---|---|
| 4,825,727 A * | 5/1989 | Komuro | ............... | F16H 1/227 74/413 |
| 4,828,049 A * | 5/1989 | Preis | ............... | B23B 45/008 173/217 |
| 5,336,136 A * | 8/1994 | Jacqui | ............... | E06B 9/72 475/275 |
| 5,429,558 A * | 7/1995 | Lagarde | ............... | F16H 1/2836 475/331 |
| 6,100,659 A | 8/2000 | Will et al. | | |
| 6,379,276 B1 * | 4/2002 | Cheng | ............... | F16H 37/0826 475/330 |
| 6,628,029 B2 * | 9/2003 | Astegno | ............... | E06B 9/72 160/310 |
| 6,794,778 B1 | 9/2004 | Walker et al. | | |
| 6,967,418 B2 | 11/2005 | Cavarec et al. | | |
| 6,979,962 B2 | 12/2005 | Cavarec et al. | | |
| 6,994,651 B2 * | 2/2006 | Fox | ............... | F16C 33/605 475/335 |
| 7,297,086 B2 * | 11/2007 | Fox | ............... | F16H 1/2836 475/331 |
| 7,413,025 B2 * | 8/2008 | Provost | ............... | F16H 1/46 173/176 |
| 7,775,595 B2 * | 8/2010 | McMillen | ............... | B60N 2/0232 248/424 |
| 8,277,358 B2 * | 10/2012 | Gasparrini | ............... | E06B 9/68 475/331 |
| 8,920,284 B2 * | 12/2014 | Fox | ............... | F16C 19/38 384/128 |
| 9,046,155 B2 * | 6/2015 | Hagedorn | ............... | F16H 35/10 |
| 9,062,756 B2 * | 6/2015 | Hagedorn | ............... | F16H 57/082 |
| 9,068,646 B2 * | 6/2015 | Hagedorn | ............... | E05F 15/611 |
| 9,109,677 B2 * | 8/2015 | Wang | ............... | A01D 34/00 |
| 9,145,967 B2 * | 9/2015 | Fox | ............... | F16H 57/082 |
| 9,303,729 B2 * | 4/2016 | Wang | ............... | F16H 1/46 |
| 9,366,317 B2 * | 6/2016 | Croce | ............... | F16H 57/082 |
| 9,657,516 B2 * | 5/2017 | Graybar | ............... | E06B 9/70 |
| 2006/0232233 A1 * | 10/2006 | Adams | ............... | E06B 9/72 318/280 |
| 2007/0056697 A1 | 3/2007 | Chen | | |
| 2008/0252096 A1 * | 10/2008 | Mueller | ............... | B60J 1/2019 296/143 |
| 2009/0082168 A1 * | 3/2009 | Yen | ............... | F16H 1/46 475/337 |
| 2010/0180708 A1 | 7/2010 | Kos et al. | | |
| 2010/0323836 A1 * | 12/2010 | Wang | ............... | F16H 1/46 475/1 |
| 2012/0091804 A1 | 4/2012 | Altonen et al. | | |
| 2012/0202641 A1 | 8/2012 | Sappenfield | | |
| 2013/0040777 A1 * | 2/2013 | Gassmann | ............... | F16H 1/46 475/337 |
| 2015/0105208 A1 * | 4/2015 | Hagedorn | ............... | E05F 15/614 475/149 |

FOREIGN PATENT DOCUMENTS

| | | | | |
|---|---|---|---|---|
| DE | 102008058098 A * | 5/2009 | ............... | F16H 1/46 |
| DE | 202008013354 | 3/2010 | | |
| DE | 202012101593 | 6/2012 | | |
| EP | 2182163 | 5/2010 | | |
| EP | 2385210 | 11/2011 | | |
| EP | 2506034 | 10/2012 | | |
| FR | 2514067 | 4/1983 | | |
| JP | 2005256321 | 9/2005 | | |
| WO | WO 2006/107602 | 10/2006 | | |
| WO | WO 2008/148386 | 12/2008 | | |
| WO | WO 2010/136917 | 12/2010 | | |
| WO | WO-2014068598 A1 * | 5/2014 | ............... | F02N 15/046 |
| WO | WO 2014/143655 | 9/2014 | | |
| WO | WO 2014/143867 | 9/2014 | | |
| WO | WO 2014/144008 | 9/2014 | | |
| WO | WO 2014/152427 | 9/2014 | | |

OTHER PUBLICATIONS

PCT/US2014/028234 International Preliminary Report on Patentablility dated Sep. 15, 2015 (14 pages).
PCT/US2014/028023 International Search Report and Written Opinion dated Aug. 29, 2014 (16 pages).
PCT/US2014/028023 International Preliminary Report on Patentablility dated Sep. 15, 2015 (12 pages).
PCT/US2014/027330 International Search Report and Written Opinion dated Aug. 29, 2014 (18 pages).
PCT/US2014/027330 International Preliminary Report on Patentablility dated Sep. 15, 2015 (12 pages).
PCT/US2014/027251 International Search Report and Written Opinion dated Jun. 11, 2014 (9 pages).
PCT/US2014/027251 International Preliminary Report on Patentablility dated Sep. 15, 2015 (7 pages).

* cited by examiner

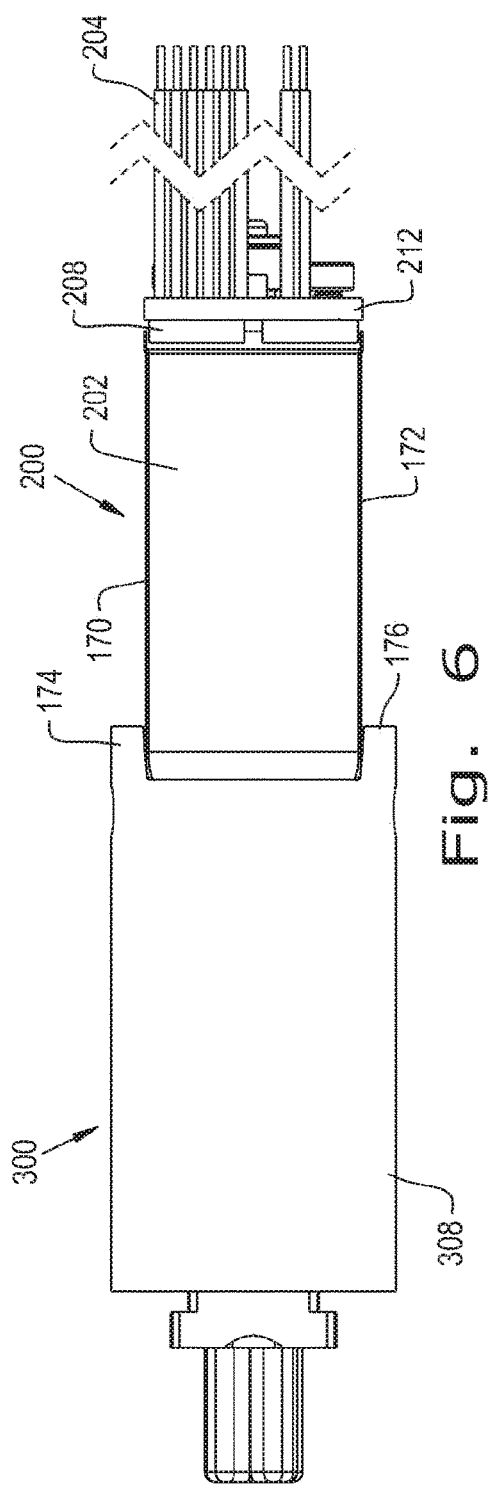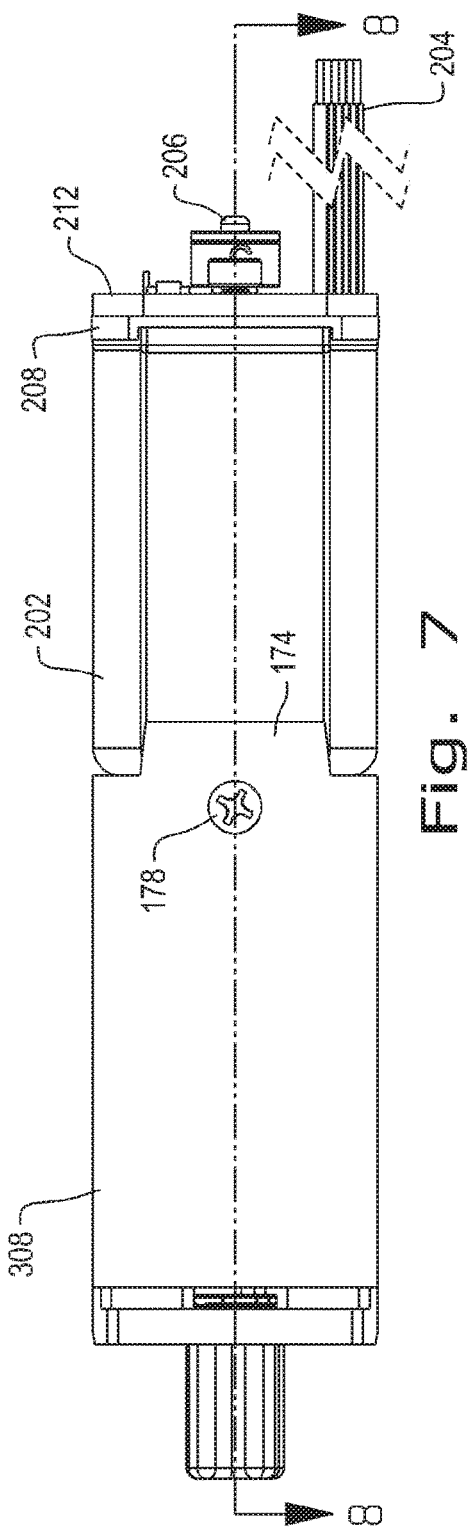

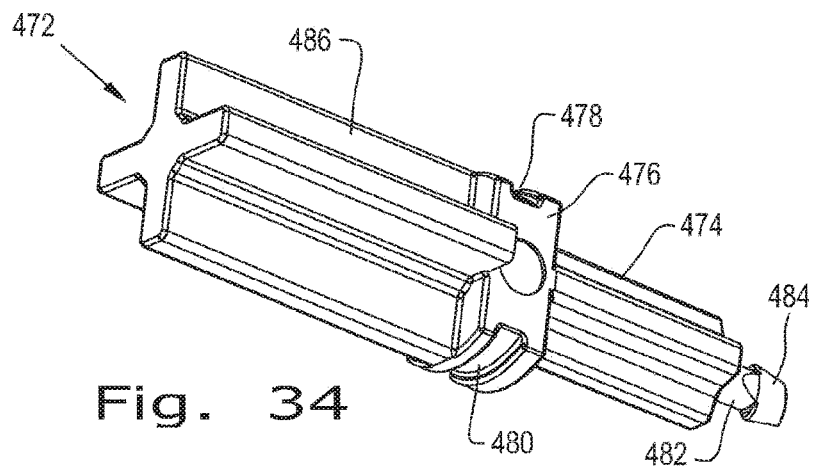
Fig. 34
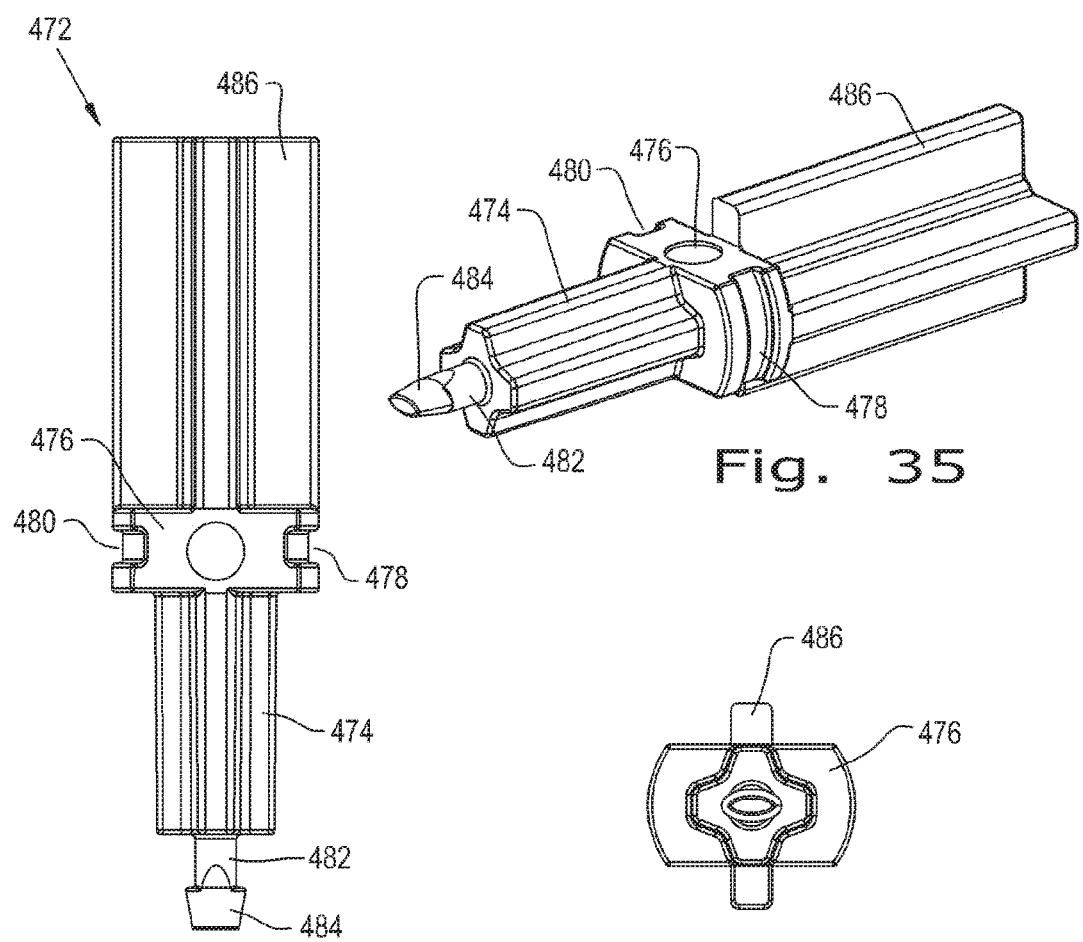
Fig. 35
Fig. 36
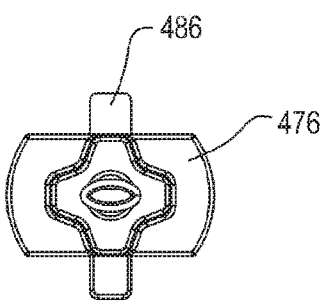
Fig. 37

WINDOW COVERING MOTORIZED LIFT AND CONTROL SYSTEM GEAR TRAIN

CROSS REFERENCE TO RELATED APPLICATIONS

The present application is a continuation application of U.S. application Ser. No. 14/777,276, filed on Sep. 15, 2015, which is a national stage entry of International Patent Application Number PCT/US2014/027330, filed Mar. 14, 2014, which claims the benefits of, and priority to U.S. Provisional Application Ser. No. 61/792,226, filed Mar. 15, 2013, the contents of which are hereby incorporated by reference in their entirety.

FIELD OF THE INVENTION

The present invention relates generally to window coverings, and, more specifically, to motorized window coverings and the operating systems provided therefor.

BACKGROUND OF THE INVENTION

Motorized operating systems have been provided for window coverings of various types. Often the systems have been expensive and somewhat difficult to install, prepare for use and operate. Known systems have been noisy and large in physical size. Many are relatively inflexible, being factory programmed for specific operations and performance, while enabling little, if any user input, adjustment or alteration to the factory installed programming. As a result, motorized operating systems have been found most often on shades for extremely large windows, windows that are difficult to access for manual operation of a shade or for windows in commercial settings. Motorized operating systems have not achieved wide acceptance or use in residential use situations.

SUMMARY OF THE INVENTION

The window covering motorized lift and control system disclosed herein provides a low-cost, yet efficient and reliable motorized operating system for window coverings of many different types, styles and sizes. Plastic gears are used for the cost and noise benefits gained there with. For increased strength, helical plastic gears and gear train components are used, and the structural arrangements and configurations of the components overcome thrust loading and other forces that have made the use of small plastic helical gears unsuccessful in the past. A high speed motor is used with multiple planetary gear stages for speed reduction. The drive assembly and drive shaft are arranged side-by-side for a compact assembly. A magnetic encoder also provides magnetic braking. A variety of sensors can be incorporated into the bottom rail of the window covering and/or into a hand held user input device to improve performance and reliability.

Other features and advantages of the invention will become apparent to those skilled in the art upon review of the following detailed description, claims and drawings in which like numerals are used to designate like features.

BRIEF DESCRIPTION OF THE DRAWINGS

FIG. 6 is an elevational view of the motor and drive assembly;

FIG. 7 is an elevational view of the motor and drive assembly from a different angle;

FIG. 34 is a perspective view of an output shaft in the gear train;

FIG. 35 is another perspective view of the output shaft shown in FIG. 34, with the output shaft being shown from a different angle than that of FIG. 34;

FIG. 36 is a plan view of the output shaft shown in FIGS. 34 & 35;

FIG. 37 an end view of the output shaft shown in FIGS. 34-36;

Figure 1:
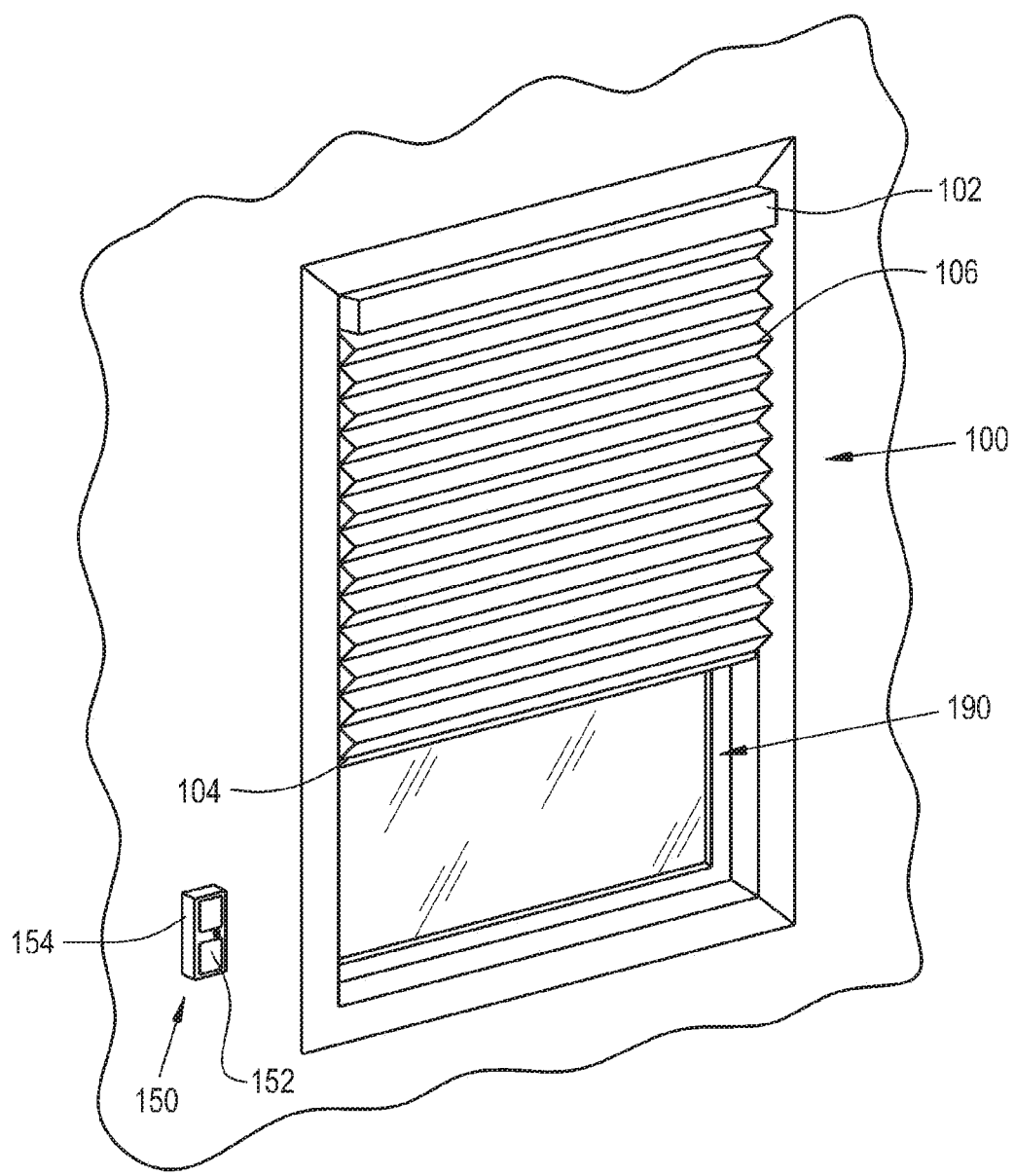
FIG. 1 is a perspective illustration of a window covering on a window.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE INVENTION

Referring now to the drawings more specifically, and to FIG. 1 in particular, a window covering 100 is shown on an architectural opening 190, such as a window. Window covering 100 includes a head rail 102, a bottom rail 104 and window covering material 106, such as a fabric material as shown in the exemplary embodiment, extending between head rail 102 and bottom rail 104. It should be understood that the mechanism and system to be described hereinafter can be used on window coverings of various types, and the specific type shown is merely one example. For example, the mechanism and system disclosed herein can be adapted for use on various types of horizontal blinds and shades to move the blind or shade vertically, as well as on vertical window coverings such as drapes to move the window covering horizontally.

Figure 2:
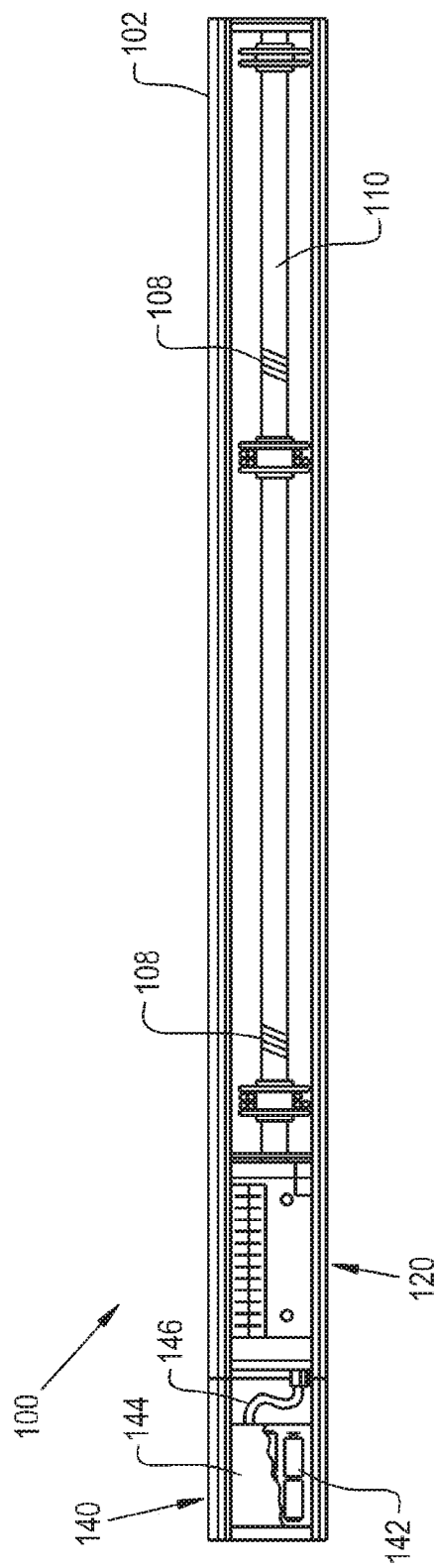
FIG. 2 is a top view into the window covering head rail.

As shown in FIG. 2, window covering 100 includes lift cords 108 for raising and lowering window covering material 106, two such lift cords 108 being shown in the drawings. For larger window coverings, three or more lift cords might be used. As known to those skilled in the art, a rotatable lift cord take-up shaft or mandrel 110 is provided about which the lift cords 108 are wound and unwound for raising and lowering window covering material 106. Each of the lift cords 108 is connected at one end to bottom rail 104 and at the opposite end to lift cord take-up shaft 110. Lift cords 108 extend through window covering material 106 between head rail 102 and bottom rail 104. Again, various types of rotatable structures can be used for winding and unwinding the lift cords as bottom rail 104 is raised or lowered to expose or cover portions of the window there behind.

Figure 3:
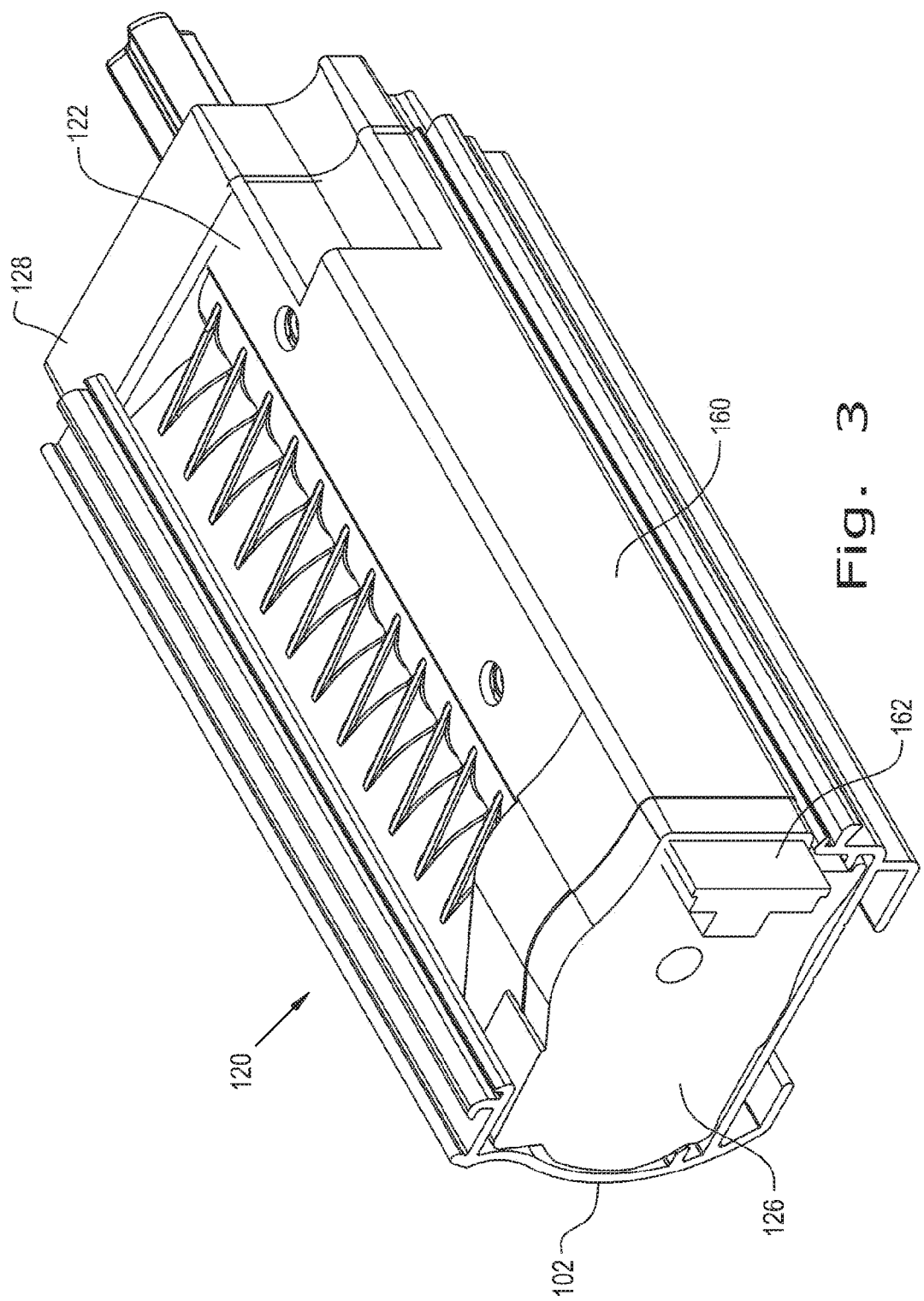
FIG. 3 is a perspective view of the motorized lift assembly in the window covering.
Figure 4:
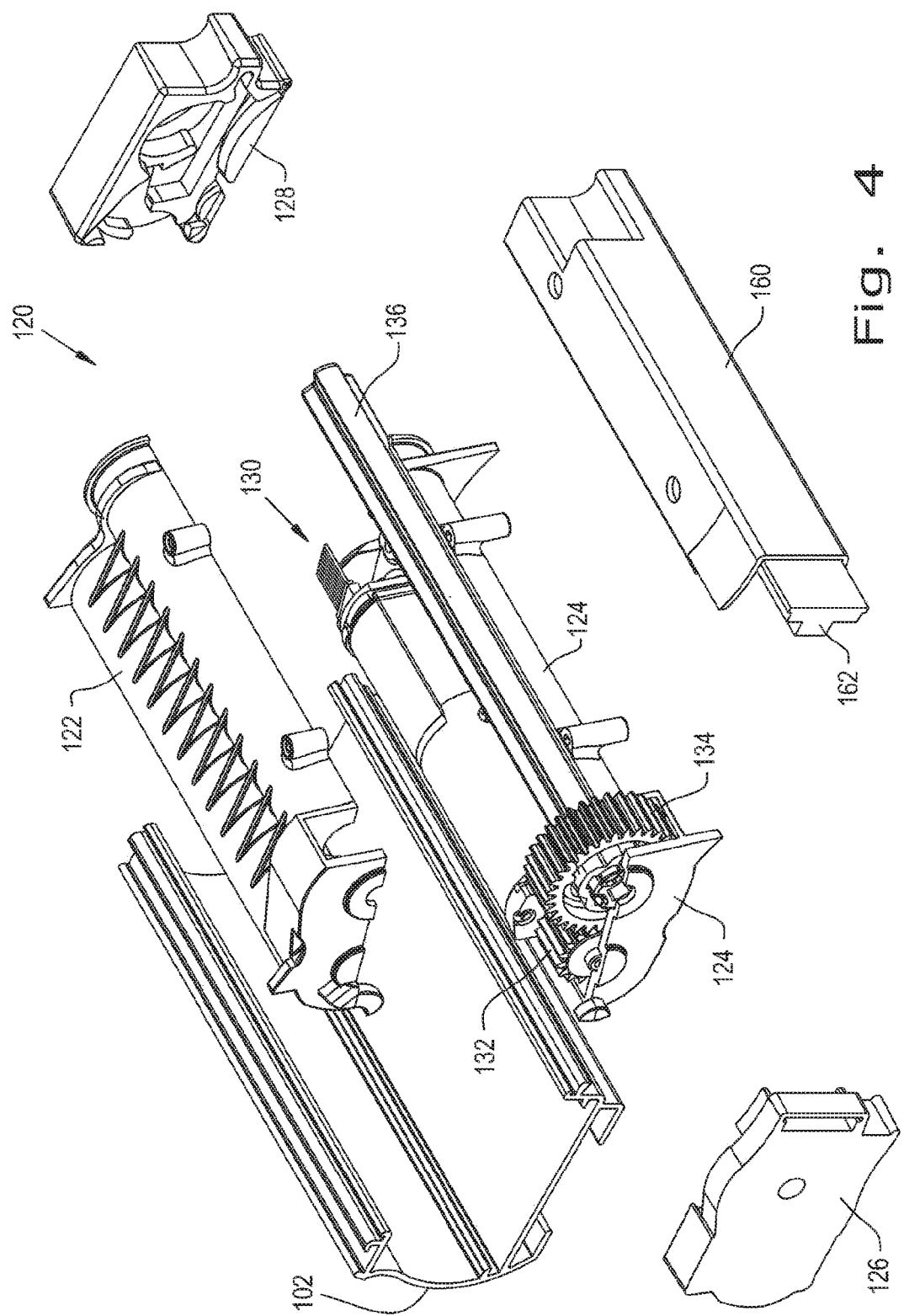
FIG. 4 is an exploded view of the motorized lift assembly.
Figure 5:
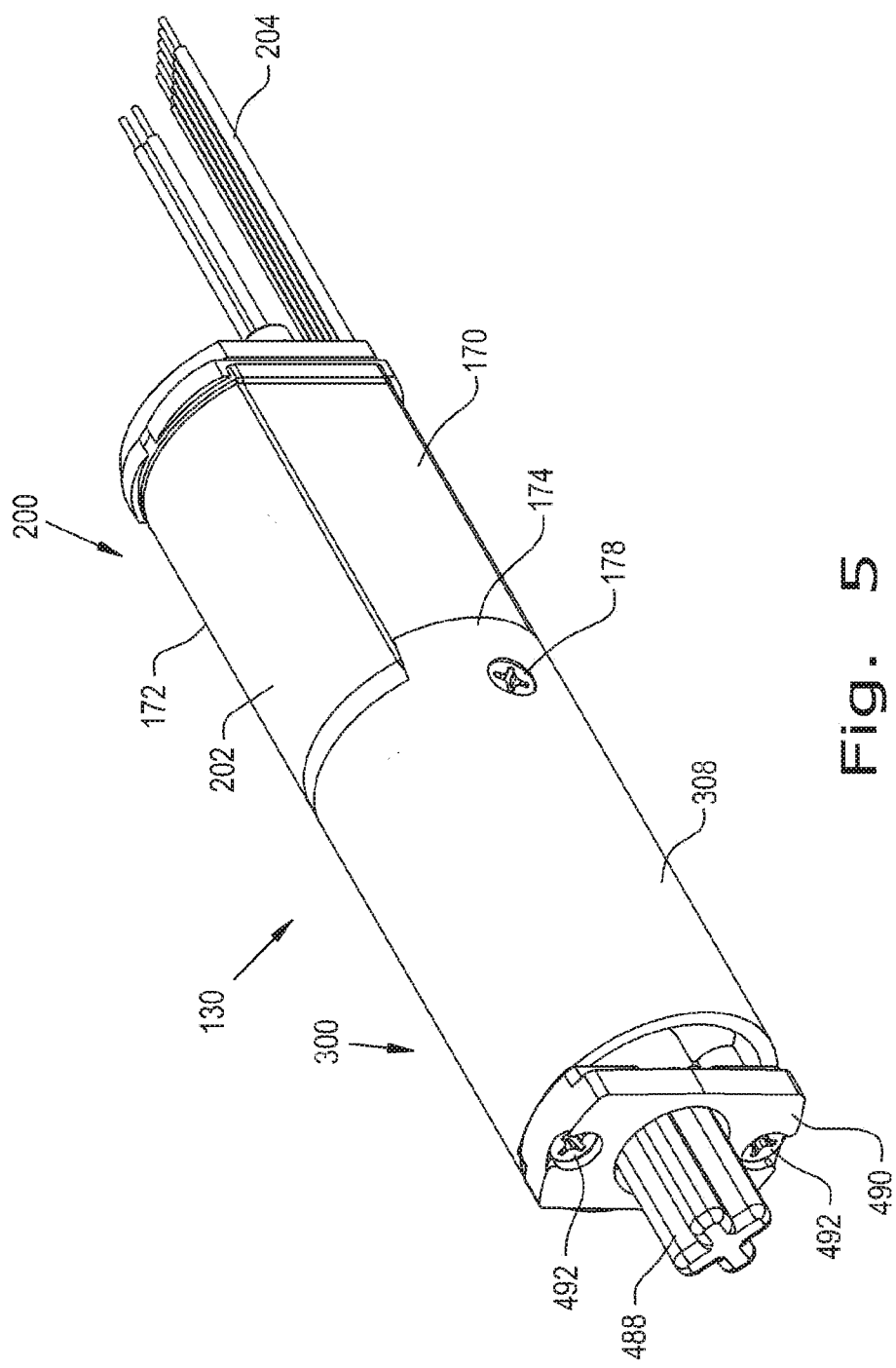
FIG. 5 is a perspective view of the motor and drive assembly in the lift assembly.
Figure 8:
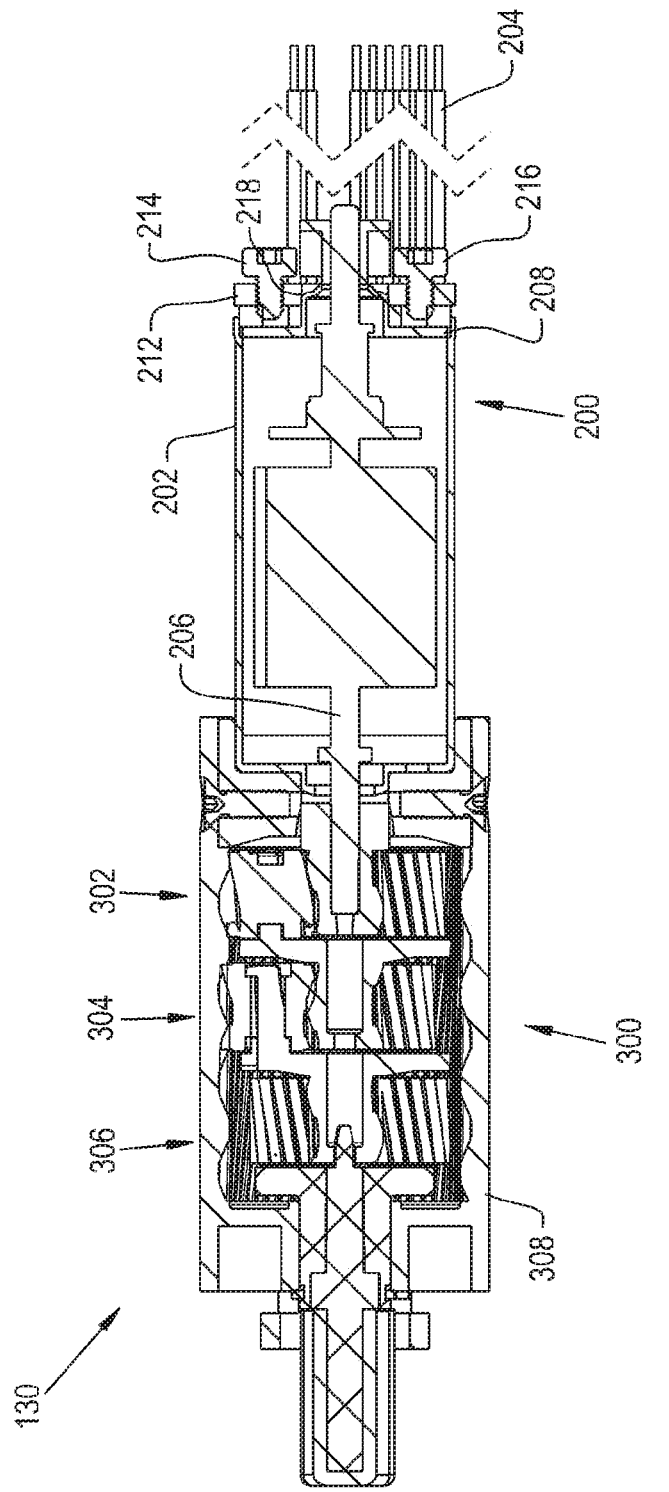
FIG. 8 is a cross-sectional view of the motor and drive assembly, the cross-section taken on line 8-8 of FIG. 7.
Figure 9:
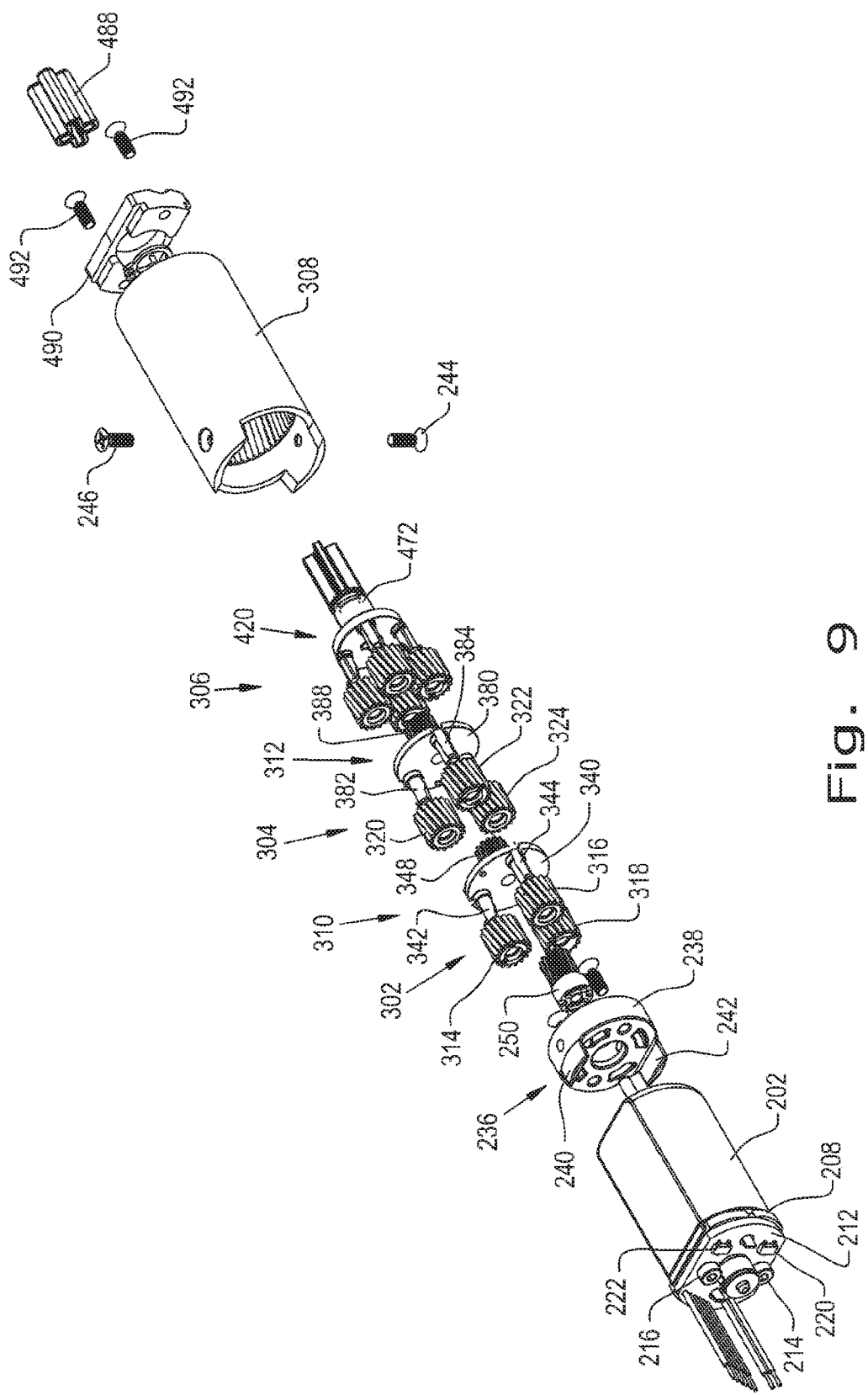
FIG. 9 is an exploded view of the motor and drive assembly.
Figure 10:
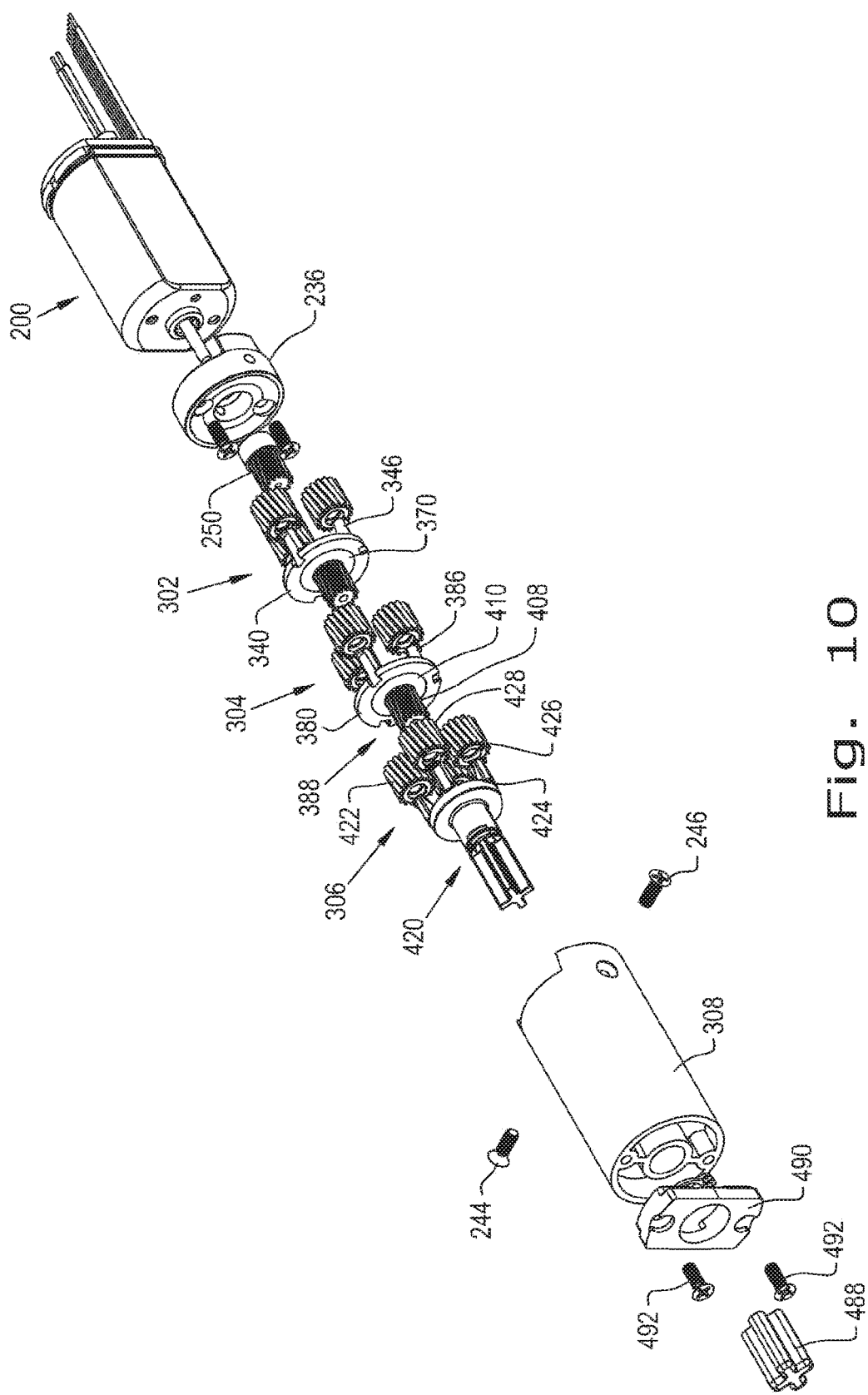
FIG. 10 is an exploded view of the motor and drive assembly taken generally from an opposite perspective to that shown in FIG. 9.
Figure 11:
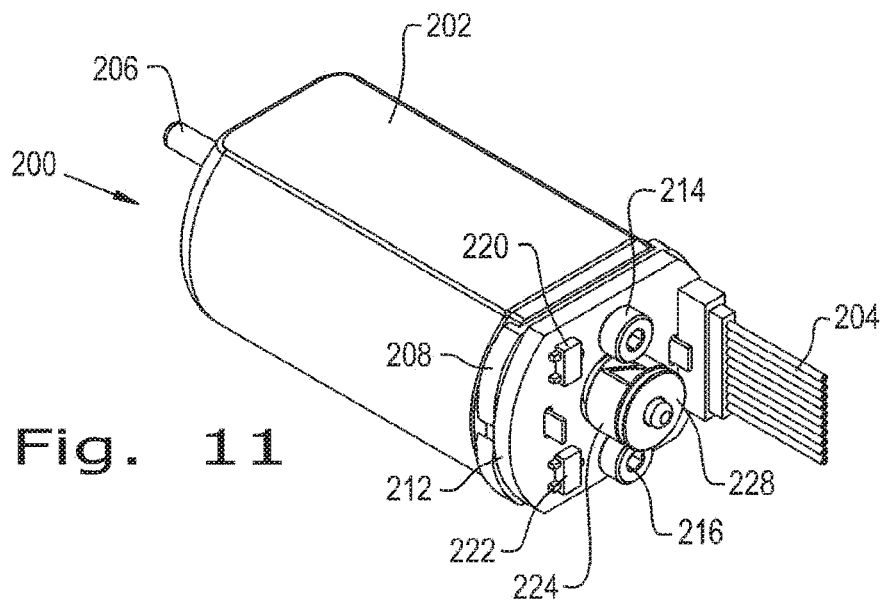
FIG. 11 is a perspective view of the motor assembly.
Figure 12:
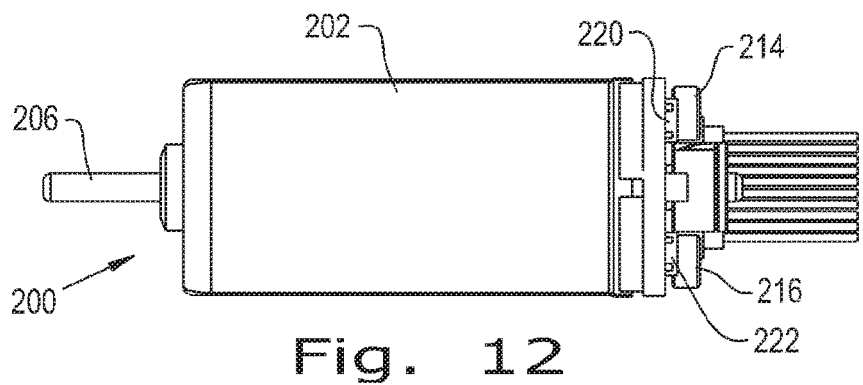
FIG. 12 is an elevational view of the motor assembly.
Figure 13:
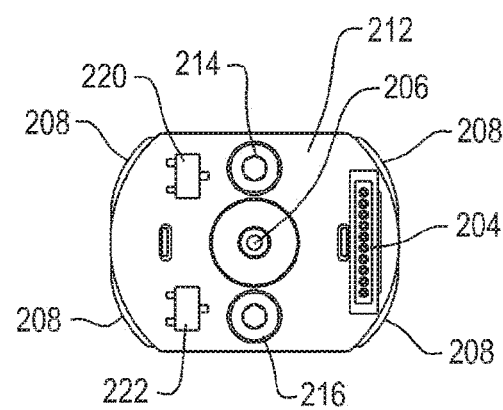
FIG. 13 is an end view of the motor assembly.
Figure 14:
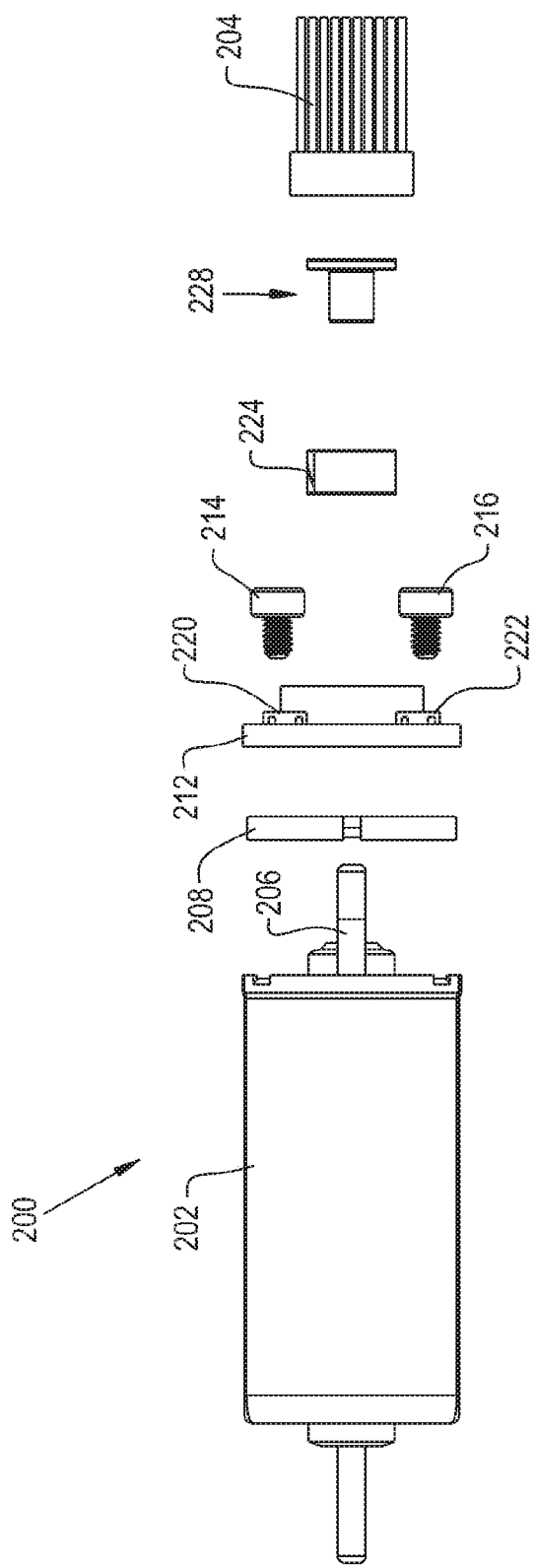
FIG. 14 is an exploded view of the motor assembly.
Figure 15:
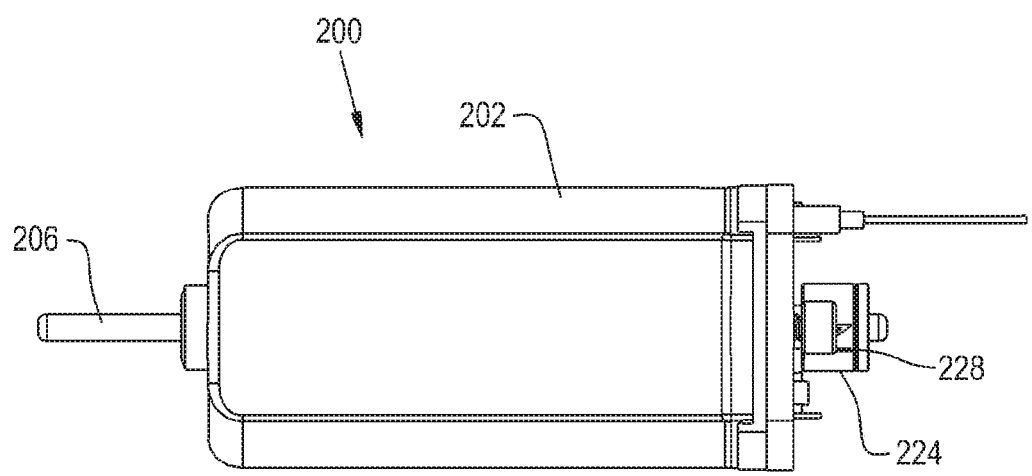
FIG. 15 is another elevational view of the motor assembly.
Figure 16:
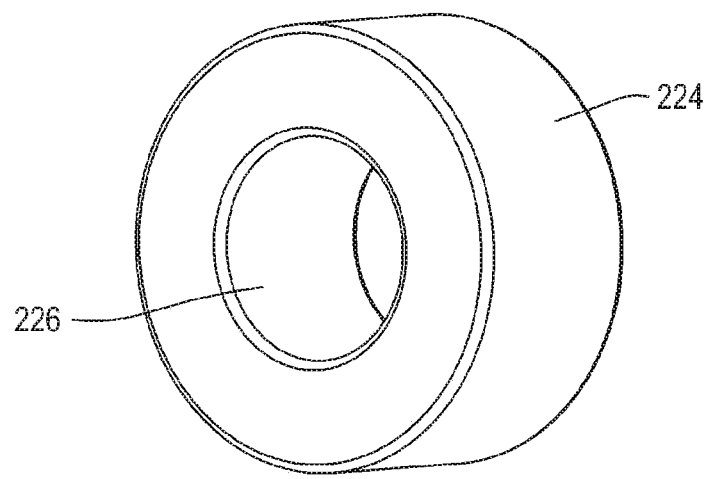
FIG. 16 is a perspective view of a ring magnet in the motor assembly.
Figure 17:
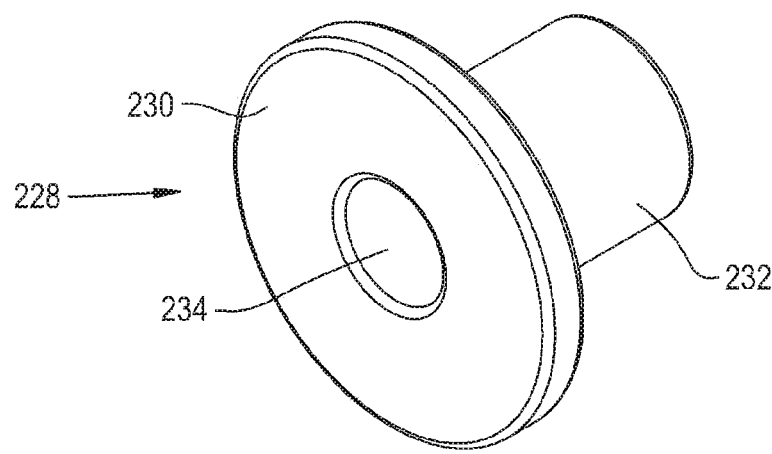
FIG. 17 is a perspective view of a magnet insert in the motor assembly.

Window covering 100 is a motor operated window covering having a motorized lift assembly 120 provided for rotating take-up shaft 110 when lifting and lowering bottom rail 104. Motorized lift assembly 120 fits snugly and securely into head rail 102. Referring now to FIGS. 3 & 4, motorized lift assembly 120 includes an upper housing 122, a lower housing 124 and end isolators 126, 128. Upper and lower housings 122, 124 can be of various materials including plastics and metals, such as, for example, aluminum. Other materials, including other metals also are suitable for upper housing 12 and lower housing 124. End isolators 126, 128 are of resilient materials for damping vibrations, muffling sounds and effectively sealing the ends of the assembled upper and lower housings 122, 124 for sound management purposes. End isolators 126, 128 also facilitate the secure, yet resilient mounting of motorized lift assembly 120 within head rail 102, to further assist in the management and mitigation of sound and vibrations. End isolators 126, 128 fit securely in head rail 102 and provide a resilient suspension for motorized lift assembly 120 within head rail 102, thereby isolating motorized lift assembly 120 from direct contact with head rail 102, and minimizing transfer to head rail 102 of sound and vibration generated by motorized lift assembly 120.

Within the assembled upper housing 122 and lower housing 124, motorized lift assembly 120 includes a motor and drive assembly 130 having an output driving gear 132 that is drivingly engaged with a driven gear 134 for rotating a driveshaft 136. Driveshaft 136 is operatively and drivingly connected to lift cord take-up shaft 110, so that operation of motor and drive assembly 130 rotates drive shaft 136 which in turn rotates lift cord take-up shaft 110.

A power source 140 (FIG. 2) is provided for supplying electrical power to operate motorized lift assembly 120. Those skilled in the art will readily understand and recognize that power source 140 can be a connection to a source of alternating current, such as the electrical system of the building in which the window covering is installed. In the exemplary embodiment shown, power source 140 is a direct current power source including a plurality of batteries 142 contained in a battery compartment 144. An electrical lead 146 is provided from the batteries 142 in battery compartment 144 to motor and drive assembly 130. Batteries of various types can be used, including common single use batteries and rechargeable batteries. A solar recharging system can be incorporated into the structure for continuously recharging rechargeable batteries, and photovoltaic pads for the charging system can be provided on surfaces of window covering 100, such as surfaces of head rail 102, bottom rail 104 and/or window covering material 106. Alternatively or additional, photovoltaic cells can be provided in other locations and electrically connected to rechargeable batteries in power source 140. Further, battery compartment 144 can be located and contained in other locations and in other ways. For example, in some installations the battery compartment can be relatively independent from window covering 100, connected thereto only by electrical lead 146, and concealed within a window frame, or located behind and generally concealed by the head rail and stacked window covering material even when the window is fully exposed and the covering material raised as high as possible. Still further, a false or extended front of the head rail can be used to conceal the power source, and hinged in such a manner as to tilt downwardly, exposing the battery compartment for easy access to the batteries for replacement. As yet another alternative, a battery and battery compartment may be contained in the bottom rail of a window covering, thereby allowing easy access for battery replacement.

An operating and control device 150 (FIG. 1) is provided for operating motorized lift assembly 120. Operating and control device 150 includes a handheld remote control user input device 152 and a remote control mounting device 154 for receiving and holding the handheld remote control user input device 152. Mounting device 154 can be installed at or near window covering 100, such as on a window frame, adjacent wall, or the like. Further, mounting device 154 can be placed at any other location of convenience, such as another wall, for example. Several mounting devices can be used, each placed at a different desirable location for conveniently holding remote control user input device 152. Mounting device 154 is merely a holder for retaining remote control user input device 152 for easy location and access. Remote control user input device 152 can be removed from mounting device 154 and carried on a person, placed on a surface or otherwise located and used. Mounting device 154 is not required for the operation of remote control user input device 152 and is instead provided for user convenience. However, remote control user input device 152 can be accessed and operated while retained in mounting device 154. It is not required to remove remote control user input device 152 from mounting device 154 for the operation of remote control user input device 152. As still another alternative, mounting device 154 can be connected electrically to the building AC power system, to an independent power system, or to a solar charging/supply system, and electrically connected to user input device 152 for charging batteries in device 152 when device 152 is placed in mounting device 154.

Referring now again to FIGS. 3 and 4, motorized lift assembly 120 further includes a PCB shroud 160 associated with upper housing 122 and lower housing 124 for retaining a printed circuit board 162 for the operation and control of motorized lift assembly 120.

As shown in FIG. 4, motor and drive assembly 130 and driveshaft 136 are positioned adjacent one another in the assembly within upper housing 122 and lower housing 124. That is, drive assembly 130 and driveshaft 136 are positioned generally side-by-side and not end-to-end. Accordingly, the overall footprint required for motorized lift assembly 120 is small in length, unlike known structures in which the components of motor and drive assemblies of motorized lift assemblies are positioned axially end-to-end with one another. The motorized lift assembly disclosed herein can be used on narrow width window coverings having minimal space not required for the lift cords and lift cord take-up shaft. The through shaft design in which a gear is provided at the driven end of driveshaft 136 also enables the use of standard spring motors and the like as auxiliary or "helper" motors. Driveshaft 136 can project outwardly beyond the driven gear 134 engaged thereon in the bypass design having motor and drive assembly 130 generally adjacent and parallel to driveshaft 136. An exposed portion of the driveshaft projecting beyond the driven gear 134 can receive a spring motor of design known to those skilled in the window covering art. Accordingly, a spring motor assist can be provided along with the operation of motorized lift assembly 120. Spring motor assist can be particularly advantageous when provided for large window coverings and/or for window coverings of particularly heavy weight.

Motor and drive assembly 130 includes a motor assembly 200 and a gear train 300. Motor assembly 200 and gear train 300 are connected to one another not only by the driving relationships of the motor assembly 200 and gear train 300, but also physically by fasteners and other connections for the management and control of load forces created during operation. Accordingly, motor assembly 200 defines flat surfaces 170, 172 on opposite sides thereof, and gear train 300 provides projections 174, 176 overlying and engaging flat surfaces 170, 172 in the assembled motor and drive assembly 130. Fasteners 178 can be used for physically attaching projections 174, 176 to flat surfaces 170, 172. As a result, rotational and axial forces tending to move motor assembly 200 and gear train 300 relative to one another are resisted and inhibited by the projections 174, 176 engaging the flat surfaces 170, 172 and the physical attachment of motor assembly 200 and gear train 300 by way of fasteners 178.

Figure 18:
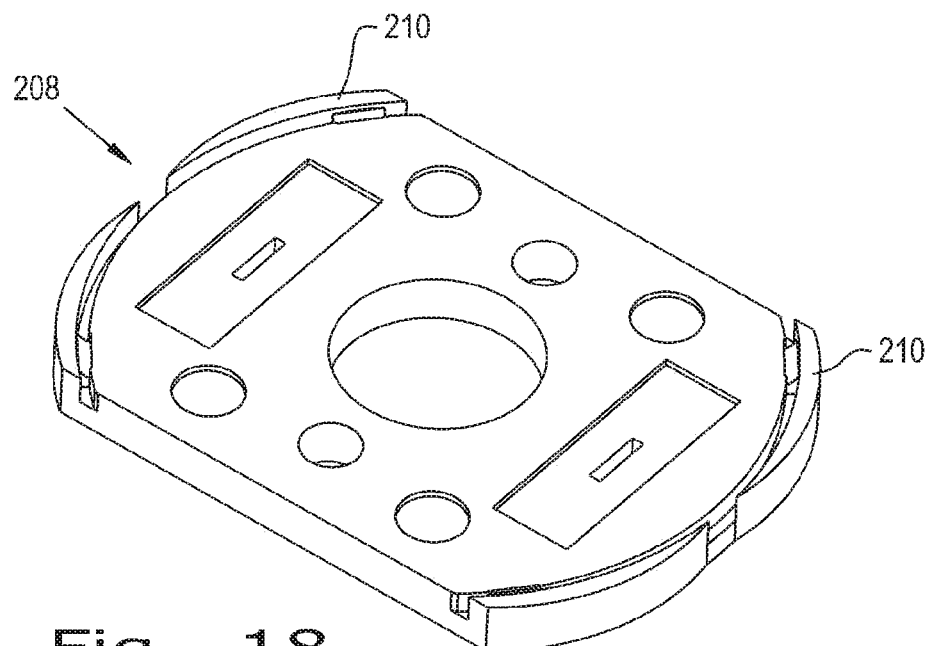
FIG. 18 is a perspective view of an encoder isolator in the motor assembly.
Figure 19:
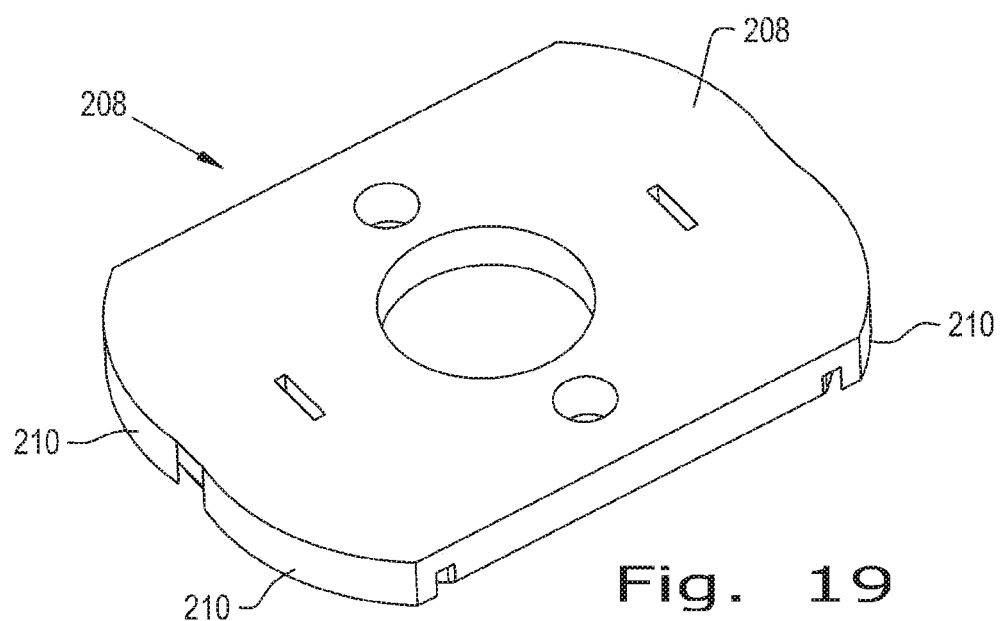
FIG. 19 is another perspective view of the encoder isolator, showing the side opposite the side shown in FIG. 18.
Figure 20:
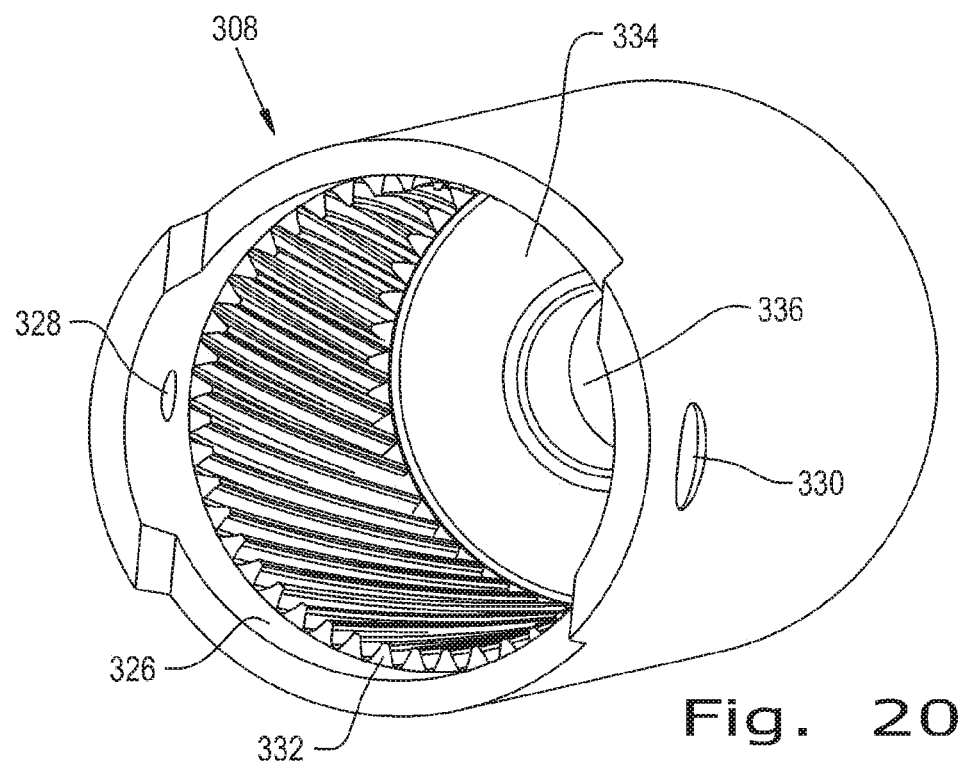
FIG. 20 is a perspective view of a ring gear in the gear train of the motor and drive assembly.
Figure 21:
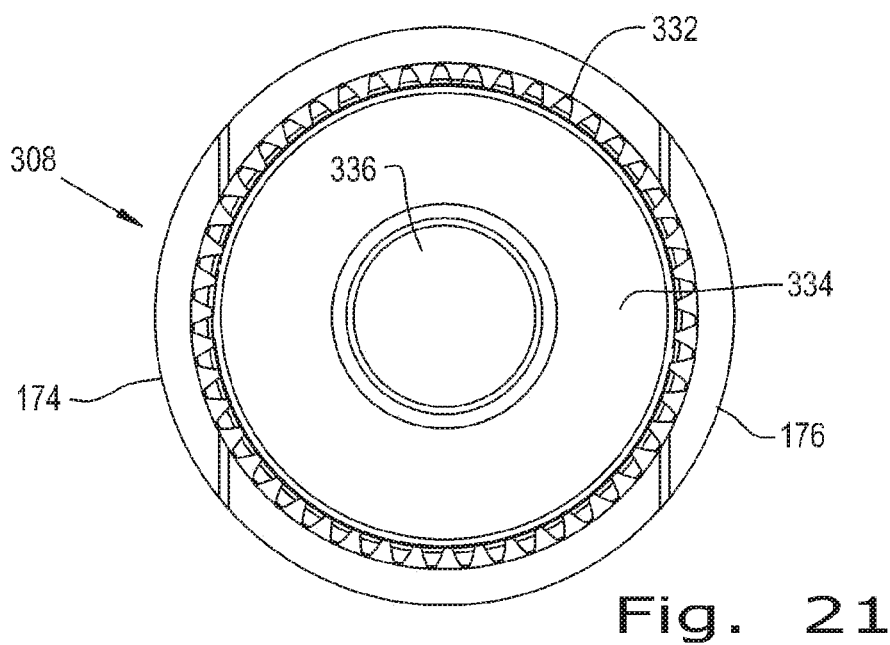
FIG. 21 is an end view of the ring gear.
Figure 22:
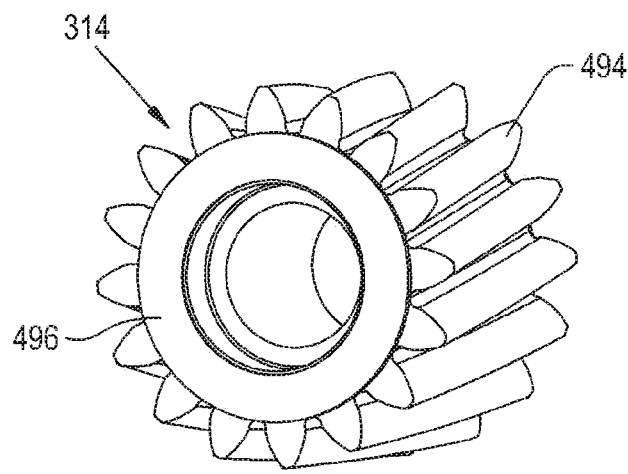
FIG. 22 is a perspective view of a planet gear in the gear train.
Figure 23:
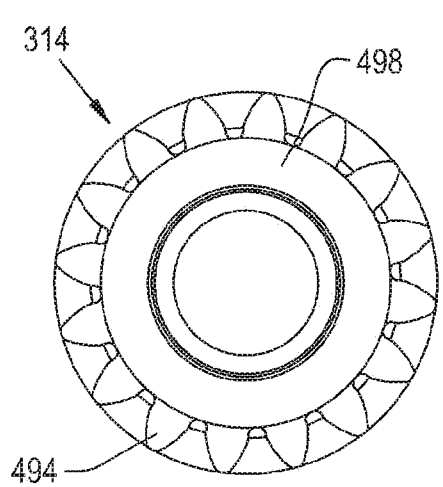
FIG. 23 is an end view of the planet gear shown in FIG. 22.
Figure 24:
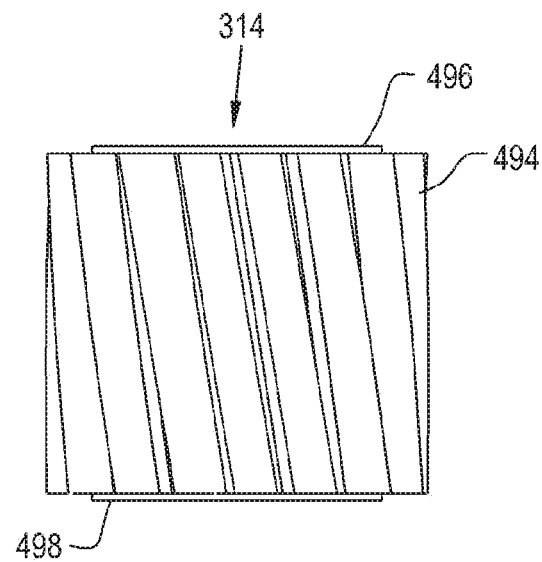
FIG. 24 is an elevational view of the planet gear shown in FIGS. 22 and 23.
Figure 25:
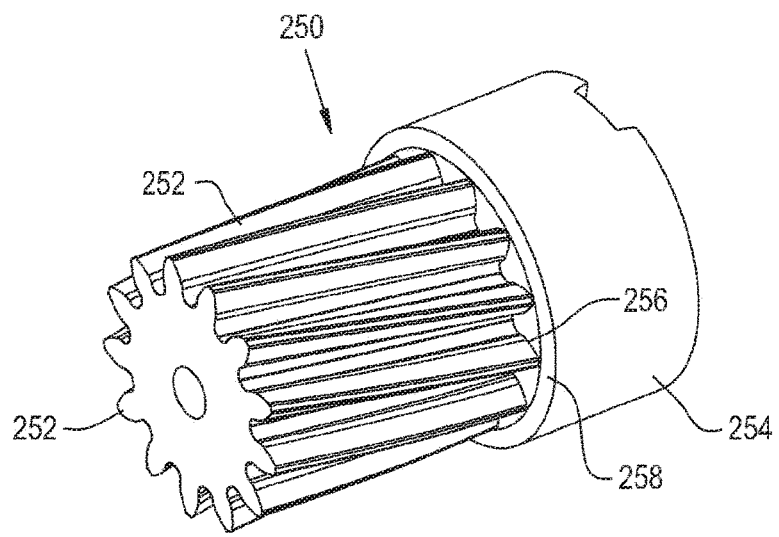
FIG. 25 is a perspective view of a sun gear in the gear train.
Figure 26:
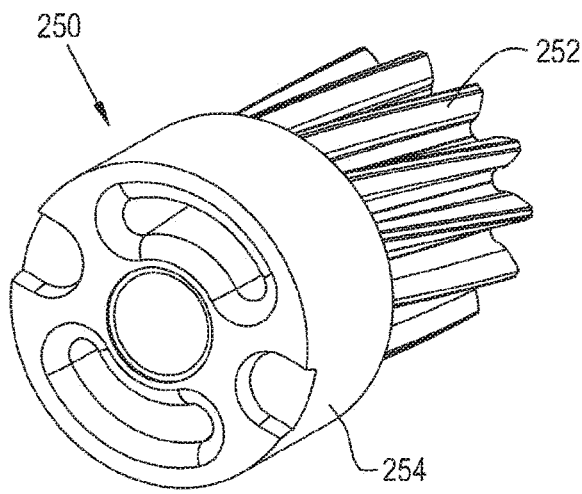
FIG. 26 is another perspective view of the sun gear generally showing the side opposite the side shown in FIG. 25.
Figure 27:
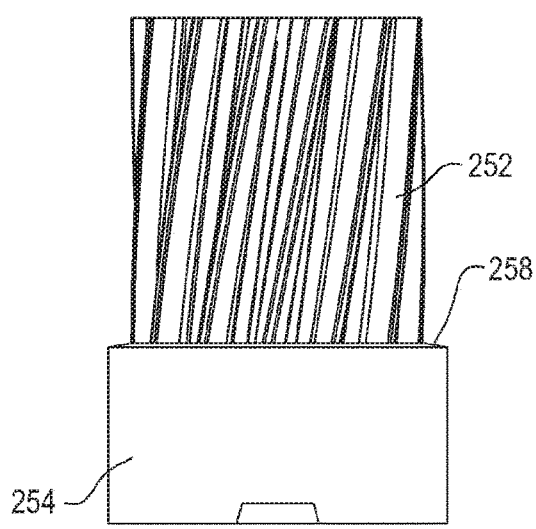
FIG. 27 is an elevational view of the sun gear shown in FIGS. 25 and 26.
Figure 28:
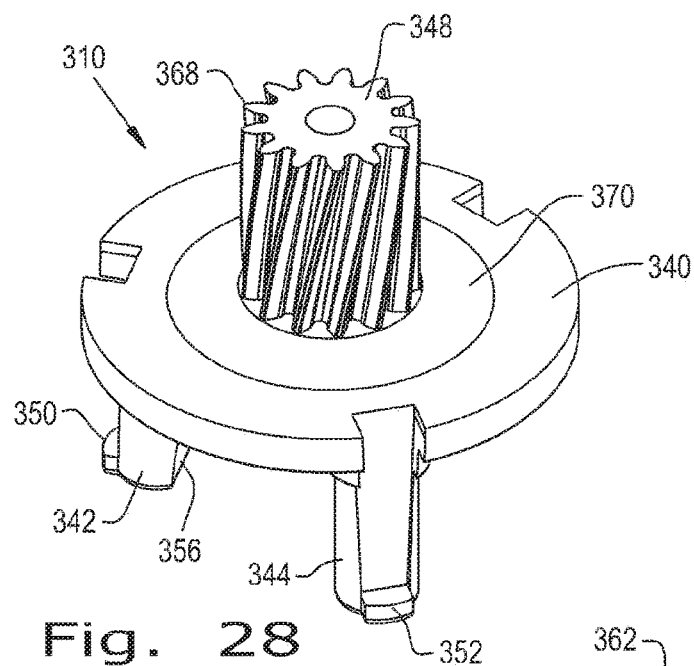
FIG. 28 is a perspective view of a planet gear carrier in the gear train.
Figure 29:
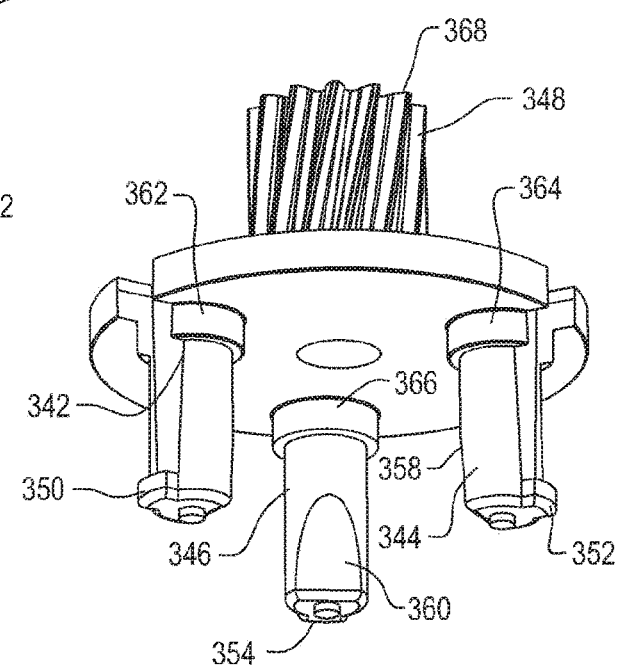
FIG. 29 is a perspective view of the planet gear carrier from an angle different than that of FIG. 28.
Figure 30:
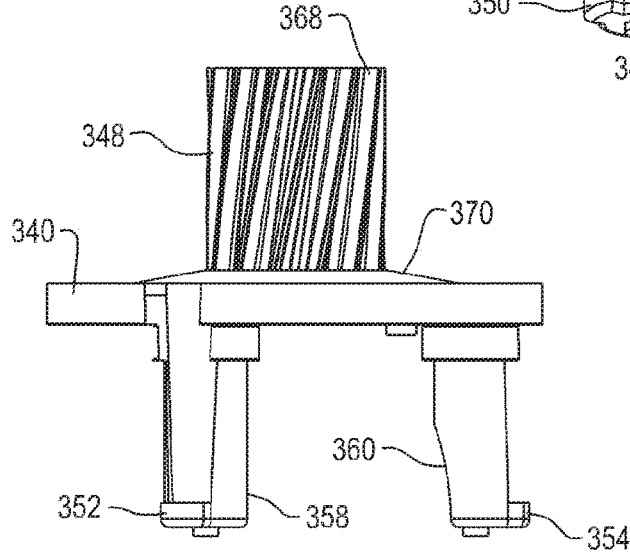
FIG. 30 is an elevational view of the planet gear carrier shown in FIGS. 28 and 29.
Figure 31:
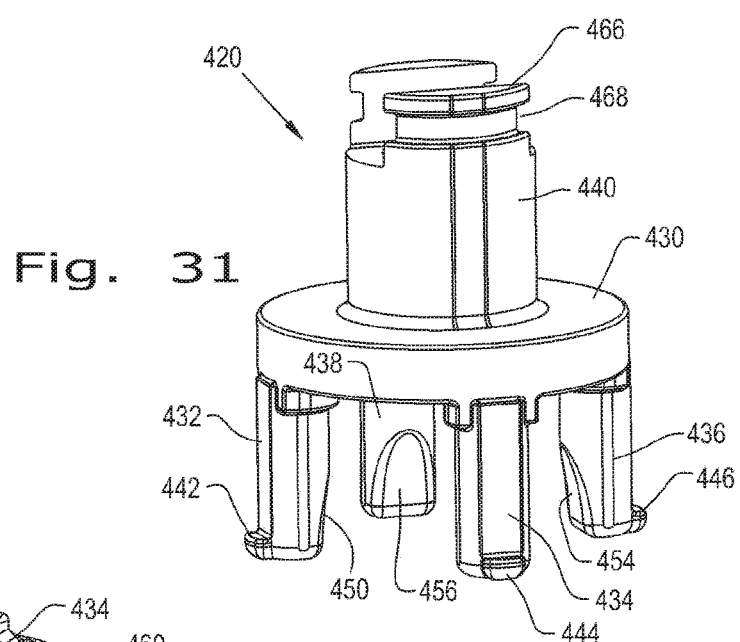
FIG. 31 is a perspective view of another type of planet gear carrier in the gear train.
Figure 32:
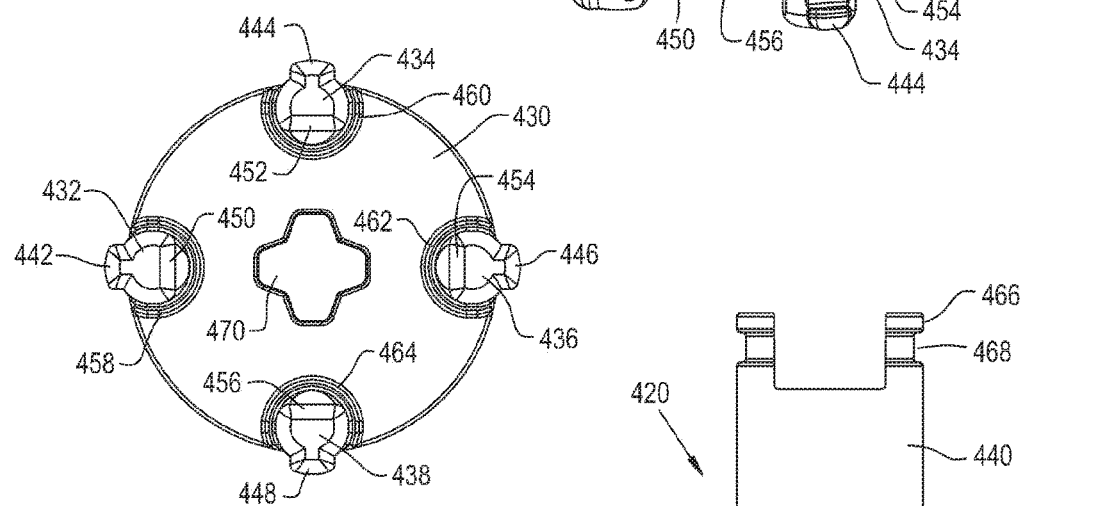
FIG. 32 is an end view of the planet gear carrier shown in FIG. 31.
Figure 33:
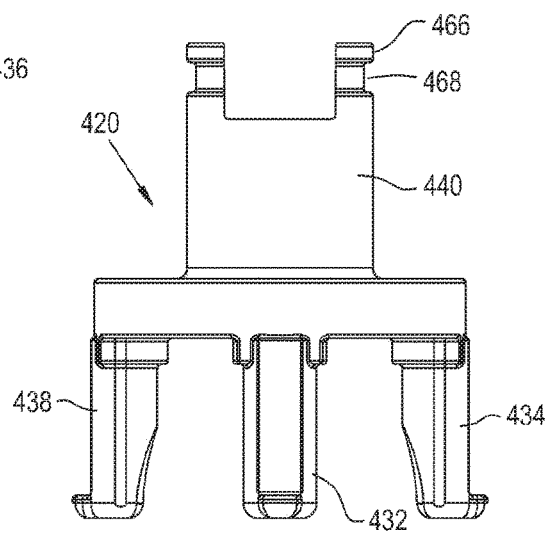
FIG. 33 is an elevational view of the planet gear carrier shown in FIGS. 31 and 32.
Figure 38:
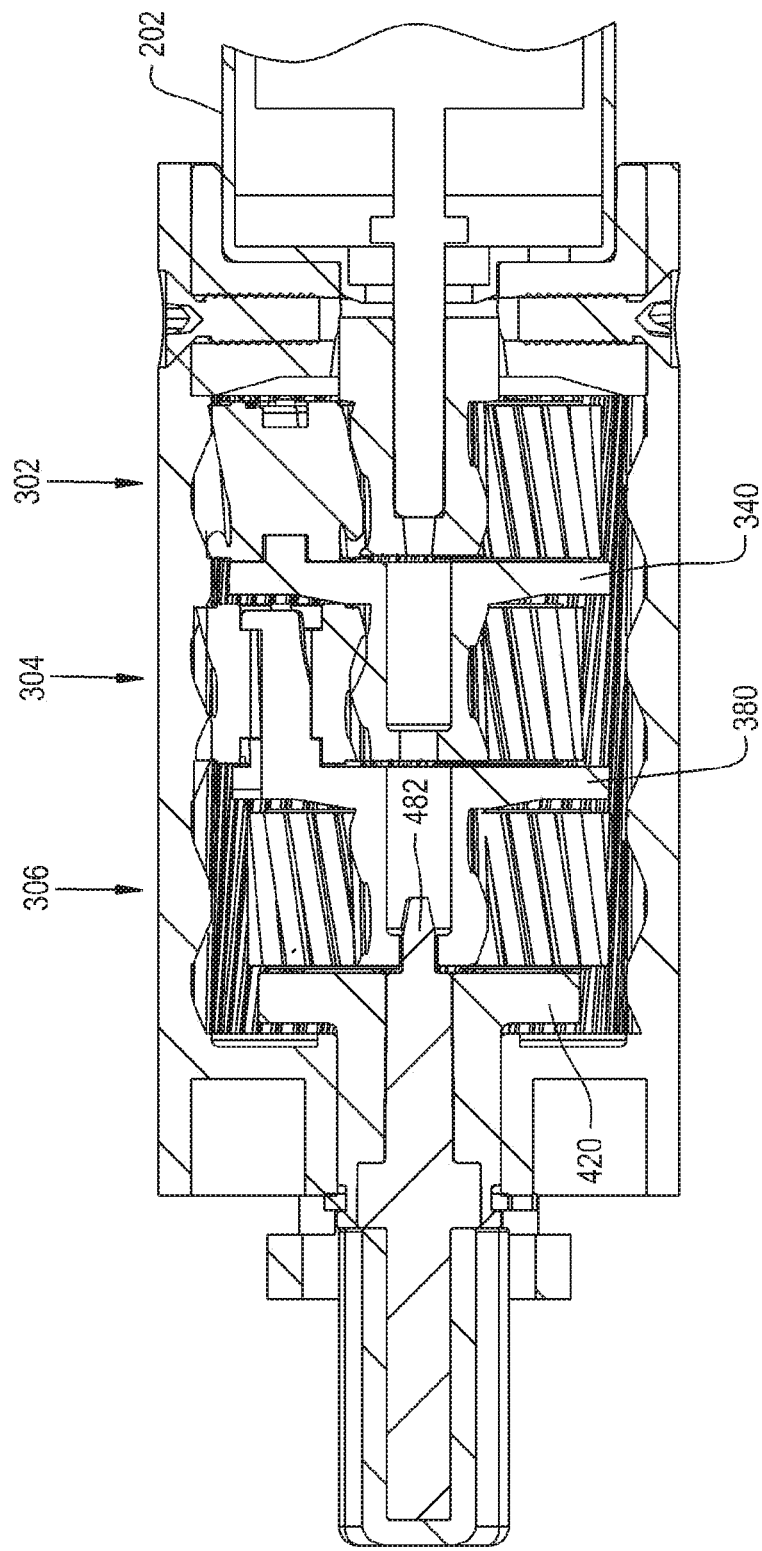
FIG. 38 is a cross-sectional view of the gear train assembly.
Figure 39:
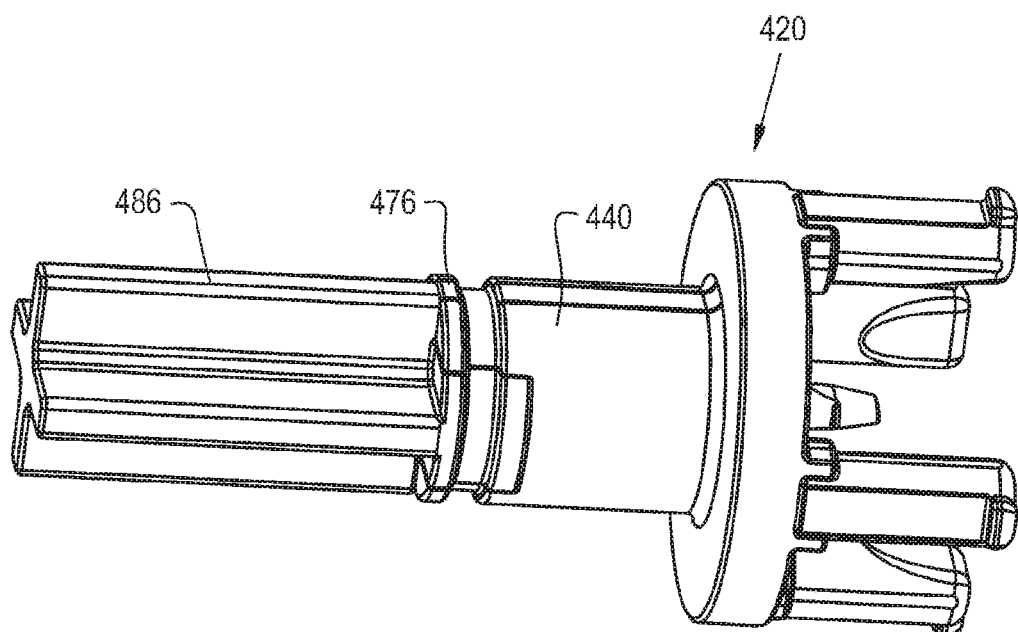
FIG. 39 is a perspective view of an output assembly in the motor and drive assembly, the output assembly including the planet gear carrier shown in FIGS. 31-33 and the output shaft shown in FIGS. 34-37.
Figure 40:
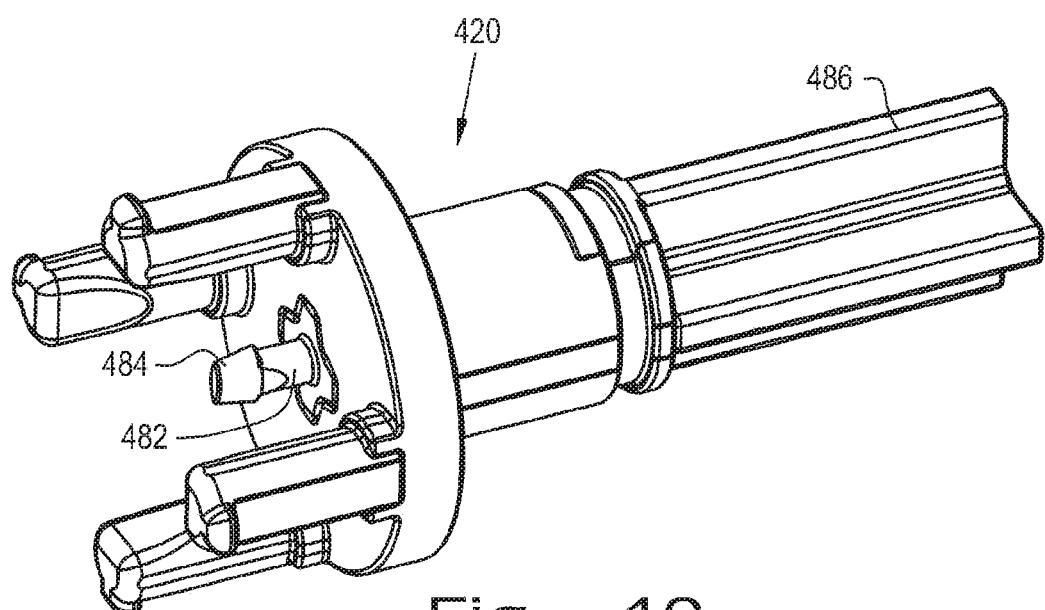
FIG. 40 is another perspective view of the output assembly shown in FIG. 39, but showing the output assembly from a different angle than that from which it is shown in FIG. 39.
Figure 41:
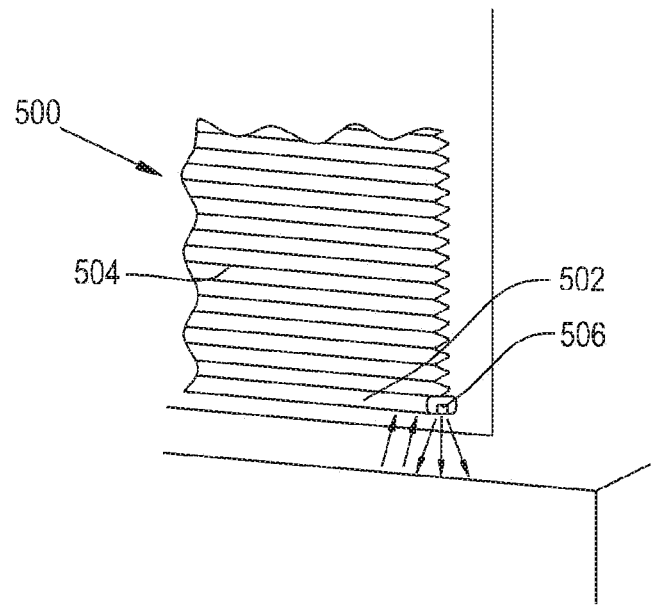
FIG. 41 is a fragmentary perspective view of another window covering on a window.

Motor assembly 200 includes a motor 202 connected by a ribbon cable 204 to the provided systems for power and control, including in the exemplary embodiment shown power source 140 and printed circuit board 162. A motor shaft 206 extends through motor 202 for drive connection on one end thereof to gear train 300, and control function at the opposite end thereof. On the control end of motor 202, an encoder isolator 208 includes a sidewall 210 (FIGS. 18 and 19) surrounding and encapsulating portions of the outer end edge of motor 202. Encoder isolator 208 electrically separates motor 202 from an encoder board 212. Encoder isolator 208 is resilient material, such as silicone, and also serves to resiliently mount motor 202 in upper housing 122 and lower housing 124. Sidewall 210 is configured to engage a shaped cavity provided in the assembled upper housing 122 and lower housing 124. To that end, sidewall 210 is shaped so as to engage the inner surface of the assembled upper housing 122 and lower housing 124 in selected multiple locations less than the full extent of its circumference. The relatively softer durometer in a multi-point contact with the housing isolates the motor from transmitting mechanical vibrations and sound to the housing while serving also as electrical and mechanical insulation between the encoder board and the motor. Accordingly, encoder isolator 208 establishes a second level of isolation to that provided by end isolators 126, 128 to inhibit the transfer of sound and vibration.

Motor 202 is a low-voltage, high-speed window shade motor. Motor 202 operates at much higher speed (rpm) than window shade motors previously known to be used, and provides improved power to size performance. Whereas it has been known in the past to use motors operating in the range of 6,000 to 12,000 rpm, motor 202 within the system disclosed herein operates in a range of about 15,000 rpm to about 20,000 rpm. Increased torque is achieved through increased speed rather than by motor size-up. Slower motors used previously operated at 50-60% efficiency, whereas the higher speed motors proposed herein can be operate readily at about 60-70% efficiency, thereby achieving operating advantages. A further benefit relating to operation and control is achieved from the use of a high speed motor 202 in the motorized lift assembly. An encoder reading on the higher speed output will "read" more frequently in a given time period than an encoder operating on a lower speed motor output. If each is geared to the same final output speed for operating the window shade, the operating system with the higher motor speed can be controlled more precisely than the operating system with a lower motor speed.

Encoder board 212 is affixed to the end of motor 202 by first and second screws 214, 216 generally positioned on opposite sides thereof. A central opening 218 in encoder board 212 accommodates the projecting end of motor shaft

206. Hall sensors 220, 222 are provided on encoder board 212. A ring magnet 224 having an axial opening 226 is secured to the end of motor shaft 206 by a magnet insert 228 which establishes a compression fit of the magnet on the motor shaft. Accordingly, magnet insert 228 includes a head 230 and cylinder 232 together defining an axial opening 234 extending through magnet insert 228. A diameter of axial opening 234 is selected to engage motor shaft 206 by an interference fit. The outer diameter of cylinder 232 is selected to engage axial opening 226 of ring magnet 224 also by interference fit. Accordingly, by establishing interference fit relationships with both motor shaft 206 and ring magnet 224 magnet insert 228 secures ring magnet 224 on the motor shaft 206 so that the ring magnet rotates together with motor shaft 206. Hall sensors 220, 222 detect and relay information about the magnetic field created by magnet 224 as that magnetic field changes while the magnet rotates together with motor shaft 206. Accordingly, the information gathered can be used to determine rotations of motor 202 and therefore the distance traveled by window covering material 106 as the motor shaft rotates during lifting or lowering of the window covering material.

Screws 214, 216 are metal and thereby influence the rotation of ring magnet 224 at low speeds or when stopped. As the rotation of motor shaft 206 slows, ring magnet 224 seeks a balanced position relative to the fixed positions of metallic screws 214, 216. The magnetic field is sufficiently strong to act as a brake against the rotation of motor shaft 206 from a stopped condition. Accordingly ring magnet 224 serves the dual purposes of acting as a component of an encoder for operation and control during operation and as a component of a brake against unintended rotation or freewheeling when the operation of motor 202 is slowed or stopped.

At the driving end of motor 202, motor assembly 200 includes a ring gear mount 236 having a body portion 238 with axially projecting wings 240, 242 on opposite sides thereof. Wings 240, 242 slide against and engage flat surfaces 170, 172 during assembly. As assembled, wings 240, 242 associated with flat surfaces 170, 172 inhibit relative rotation between ring gear mount 236 and motor 202. Ring gear mount 236 is connected to motor 202 by first and second screws 244, 246 extending into an end face of motor 202. Accordingly, ring gear mount 236 is solidly connected to motor 202.

A sun gear 250 is drivingly mounted on the projecting end of motor shaft 206. Sun gear 250 is the driving connection between motor assembly 200 and gear train 300. Sun gear 250 includes helical gear teeth 252 and a base 254. Base 254 is slightly larger in diameter than the maximum diameter defined by the tips of helical gear teeth 252. Helical gear teeth 252 meet a distal end surface 256 of base 254 and extend axially outward therefrom. A shoulder 258 of base 254 extends laterally of distal end surface 256, and thus laterally beyond the tips of helical gear teeth 252 where the gear teeth meet distal end surface 256. Shoulder 258 is disposed at a slight chamfer or slope rearward relative to distal end surface 256, and therefore away from gear teeth 252.

Gear train 300 includes a plurality of epicyclic gears, and in the exemplary embodiment shown includes primary, secondary and tertiary speed reducing planetary gear stages 302, 304, 306, respectively, contained within a single elongated fixed annular or ring gear 308. Planetary gear stages 302, 304, 306 are helical in design. That is, each gear therein includes helical gear teeth, as does ring gear 308. Further, the individual gears in gear train 300 to be described subsequently are made of plastic. When made of molded plastic, substantial cost savings are achieved, thereby making a motorized shade of the present description more practical for smaller and lower cost window coverings. Since the use of plastic gears can create disadvantages, such as reduced strength compared to metal gears, helical gears have been selected for the strength and noise advantages they provide. It is known that small, lightweight plastic helical gears can cause other problems as a result of deflection from thrust loads in the basic design that must be accommodated to maintain proper gear meshing, balancing and operating efficiency. For this reason, planetary gears have not been used commonly in small lightweight plastic gear trains because it has been difficult to accommodate the various thrust forces generated by planetary gears. The present design addresses those problems.

Primary planetary gear stage 302 and secondary planetary gear stage 304 are similarly constructed and include interchangeable planet gear carriers 310, 312, respectively. Each planet gear carrier 310, 312 includes three similarly constructed planet gears, including planet gears 314, 316, 318 on primary planetary gear stage planet gear carrier 310, and planet gears 320, 322, 324 on secondary planetary gear stage planet gear carrier 312.

Ring gear 308 is a generally cylindrical body having an open end 326 at the end thereof defining the aforedescribed projections 174, 176. Projections 174, 176 each define a hole 328, 330, respectively, for receiving a fastener 178 which extends therethrough and is received in ring gear mount 236. Internally, ring gear 308 defines helical gear teeth 332. At the end opposite projections 174, 176 a substantially closed end wall 334 is provided, defining a centrally positioned hole 336.

Planet gear carrier 310 includes a plate 340 having legs 342, 344, 346 projecting outwardly from one surface thereof and an integral sun gear 348 projecting from the opposite surface thereof. Each leg 342, 344, 346 has a laterally projecting foot 350, 352, 354, respectively, at the distal end thereof. An inner surface 356, 358, 360 of, respectively, each leg 342, 344, 346 generally opposite from the laterally projecting foot 350, 352, 354 of the leg is inwardly sloped, thus defining a thinner region for each leg 342, 344, 346 at the distal end of the leg, which grows thicker in the proximal direction for a portion of the length of each leg 342, 344, 346. A collar 362, 364, 366 is provided at the base of each leg 342, 344, 346 and partly surrounds an inner portion of the leg with which it is associated.

Sun gear 348 is centrally positioned on plate 340 and defines helical gear teeth 368. At the proximal end of sun gear 348, plate 340 defines a chamfered or sloping surface 370 radially outward of the proximal ends of gear teeth 368, the sloping surface 370 sloping away from helical gear teeth 368.

Planet gear carrier 312 is similarly constructed to planet gear carrier 310, and is interchangeable therewith. Planet gear carrier 312 includes a plate 380 having legs 382, 384, 386 projecting outwardly from one surface thereof, and an integral sun gear 388 projecting from the opposite surface thereof. Each leg 382, 384, 386 has a laterally projecting foot at the distal end thereof, and an inner surface generally opposite from the laterally projecting foot that is inwardly sloped, thus defining a thinner region for each leg 382, 384, 386 at the distal end of the leg, which grows thicker in the proximal direction for a portion of the length of each leg 382, 384, 386; all as described above with respect to the corresponding features of planet gear carrier 310. A collar is provided at the base of each leg 382, 384, 386 and partly surrounds an inner portion of the leg with which it is associated, also as described above with respect to planet gear carrier 310.

Sun gear 388 is centrally positioned on plate 380 and defines helical gear teeth 408. At the proximal end of sun gear 388, the plate 380 defines a chamfered or sloping surface 410 radially outward of the proximal ends of gear teeth 408, the sloping surface 410 sloping away from helical gear teeth 408.

Tertiary planetary gear stage 306 includes a planet gear carrier 420 and four similarly constructed planet gears 422, 424, 426, 428. Planet gear carrier 420 includes a plate 430 having legs 432, 434, 436, 438 projecting outwardly from one surface thereof and an integral boss 440 projecting from the opposite surface thereof. Each leg 432, 434, 436, 438 has a laterally projecting foot 442, 444, 446, 448, respectively, at the distal end thereof. An inner surface 450, 452, 454, 456 of, respectively, each leg 432, 434, 436, 438 generally opposite from the laterally projecting foot 442, 444, 446, 446 is inwardly sloped, thus defining a thinner region for each leg 432, 434, 436, 438 at the distal end of the leg which grows thicker in the proximal direction for a portion of the length of each leg 432, 434, 436, 438. A collar 458, 460, 462, 464 is provided at the base of each leg 432, 434, 436, 438 and partly surrounds an inner portion of the leg with which it is associated.

Boss 440 is centrally positioned on plate 430 and defines a noncontinuous s collar 466 at the end thereof, noncontinuous collar 466 having a noncontinuous circumferential snap ring channel 468. Boss 440 further defines a shaped axial hole 470 extending therethrough. Boss 440 receives an output shaft 472 drivingly engaged with tertiary planet gear carrier 420 via shaped hole 470 in boss 440 engaging a complementarily shaped inner segment 474 of output shaft 472. Output shaft 472 further defines a boss 476, generally rectangular in shape with rounded ends defining snap ring channel segments 478, 480. Boss 476 fits within the open areas of noncontinuous collar 466 and snap ring channel segments 478, 480 complete a circumferential snap ring channel with the noncontinuous snap ring channel 468. At the inner end of shaped inner segment 474, a pedestal 482 includes a snap connecting head 484. Pedestal 482 and snap connecting head 484 project into secondary stage planet gear carrier 312 and engage the carrier axially so that the secondary and tertiary stages are axially tied together. This interconnection between the secondary and tertiary stages further helps manage thrust loads developed in the gear train.

Output shaft 472 extends outwardly of ring gear 308, extending through hole 336 in end wall 334. Outwardly of ring gear 308, output shaft 472 defines a drive configuration 486 for drivingly connecting to output driving gear 132. A drive isolator 488 is interposed between drive configuration 486 and output driving gear 132 mounted thereon. Drive isolator 488 is a shaped body of resilient material to inhibit the conduction of vibrations and sound from output shaft 472 to output driving gear 13 2, thus providing yet another level of isolation for sound and vibration control.

An elongated motor and drive assembly isolator 490 is connected to the end of ring gear 308 by a plurality of screws 492. Motor and drive assembly isolator 490 is of resilient material and positions and retains motor and drive assembly 130 within a shaped cavity provided by the assembled upper housing 122 and lower housing 124. Motor and drive assembly isolator 490 provides resilient yet firm positioning of the motor and drive assembly to help maintain proper alignment and positioning while damping the transmission of vibration and sound.

Each of the planet gears 314, 316, 318, 320, 322, 324, 422, 424, 426, 428 is similarly constructed to the other planet gears. Therefore, only one exemplary planet gear 314 will be described. It should be recognized that all of the planet gears 314, 316, 318, 320, 322, 324, 422, 424, 426, 428 are the same, and thus are interchangeable with one another within gear train 300. Planet gear 314 defines helical gear teeth 494 along its outer surface and running surfaces 496, 498 at opposite ends of planet gear 314.

Each of the planet gears 314, 316, 318, 320, 322, 324, 422, 424, 426, 428 will fit on any of the legs 342, 344, 346, 382, 384, 386, 432, 434, 436, 438 of the planet gear carriers 310, 312, 420 between the foot at the distal end of the leg and the collar at the proximal end of the leg. Once installed, the planet gears fit on the legs without significant play axially or radially, running against the feet at the outer ends of the planet gears and the collars at the inner ends of the planet gears. The inwardly sloped inner surfaces of the legs allow a planet gear to be tilted to slide over the foot of the leg without significant interference or resistance and without a need to deflect features of the carriers and gears. Since each planet gear is mounted on a leg in a similar manner, only the mounting of the exemplary planet gear 314 will be described relative to its mounting on leg 342, with the understanding that each of the planet gears 314, 316, 318, 320, 322, 324, 422, 424, 426, 428 is mounted in a similar fashion, one planet gear on each leg 342, 344, 346, 382, 384, 386, 432, 434, 436, 438.

Planet gear 314 is tilted outwardly generally in line with foot 350 and is slid onto the distal end of leg 342. Sloping inner surface 356 allows the tilted planet gear to slide along the length of the leg, with the planet gear straightening and aligning with the axis of leg 342 as the planet gear approaches collar 362. When the planet gear is fully mounted on the leg, foot 350 confronts one of the end running surfaces 496, 498, and collar 362 confronts the other of the end running surfaces 496, 498. It should be noted that foot 350 and all of the other feet previously described is relatively narrow and provides little running resistance against the confronting surface of the planet gear. Similarly, collar 362 only partly encircles leg 342 and provides little running resistance against the other of the confronting surfaces of the planet gear.

In the assembled form of gear train 300, the primary, secondary and tertiary planetary gear stages are held in ring gear 308, with the planet gears of the planetary gear stages drivingly engaged with helical gear teeth 332 of ring gear 308. In the assembled configuration, the planet gears are not enabled to tilt outwardly due to the closely fitting engagement with ring gear 308. Accordingly, each planet gear remains axially aligned with the leg on which it is installed and operates smoothly both rotating on the leg and revolving within ring gear 308.

The primary, secondary and tertiary planetary gear stages are snugly fit one against the other axially within ring gear 308. Sun gear 250 engages planet gears 314, 316, 318 on planet gear carrier 310. Sun gear 348 of planet gear carrier 310 engages planet gears 320, 322, 324 on planet gear carrier 312. Sun gear 388 of planet gear carrier 312 engages the four planet gears 422, 424, 426, 428 operating on planet gear carrier 314. Chamfered or sloping shoulder 258 and chamfered or sloping surfaces 370, 410 engage the respective planet gears operating there against. The helical design of the planetary threads creates an axial thrust load at the motor. The chamfered sloping shoulder end surfaces allow nonplanar contact close to the operating pitch were less sliding occurs and closer to the center to provide the least friction when load is applied. Accordingly, less resistance and less wear are experienced.

To prevent shade drift (unintended lowering over time); in lower speed motor operating systems it has been necessary to increase the natural rotational resistance present in the motor. Additional expensive magnets have been used to achieve the increased resistance. In the operating system disclosed herein, using high-speed motor 202 and gear train 300 to provide the speed reduction necessary to step the speed down provides sufficient inherent rotation resistance to prevent drift in average shades, without the need for add-on magnets.

The controls, motor and gear train are made in a sufficiently small form factor to be useable in a variety of different types of window coverings, with changes only to final gearing necessary for a particular product. High speed motors as described herein tend to have higher frequency noise, which can be mitigated somewhat more easily. The housing containing the motor and other components can be designed as a sound chamber to suppress noise. The various rubberized mounts shown and described herein can further aid noise suppression, as well as facilitating torque control.

A specific method of system feedback may be implemented into the operation of motor 202, allowing audible verification by a beep or other tone to indicate that an event or command has been implemented properly. The audible verification tone can be used in place of methods that expose a visible feedback cue (e.g. a jog of window covering material 106), to avoid moving the window covering itself to provide feedback; or an audible verification tone can be used in conjunction with a visible feedback cue. This system can use the dc motor itself to produce a sound associated with a specific feedback message. The feedback tone can be generated by applying a current to both poles of the motor simultaneously at a specified frequency. Oscillating between conditions of the motor drive, counterclockwise to clockwise, and/or braking at a specific rate can generate sounds in the human audible range. This is essentially vibrating the coils inside the motor without actually moving the window covering a measurable distance. The tone of the sound emitted from rapid alterations of motor operation is a function related to the frequency of the in-phase modulated motor pole signals. Multiple tones may be generated to provide multiple feedback or status messages to indicate to the user that a commanded operation has been completed, or to alert the user to a specific condition in the system, such as, for example, a low battery condition.

A control system for operating the window covering is designed around a mesh network control system. Every node is capable of transmitting and receiving commands or information. Each node is built around a similar RF platform for communication, with specific peripheral function added for specific node roles. Micro-current technologies allow for a platform with a simple peripheral layout to last for years on a small form factor coin-cell battery. With this realized, a printed circuit board and power source can be built into the bottom-bar of a window covering, and the printed circuit board can include many option peripheral add-on features and capabilities to operate the window covering in association with printed circuit board 162.

An operating and control device can be integrated into the bottom rail, or an independent control unit can be docked to the bottom rail. A window covering can include a control system similar to a RF operated remote control. This control system will allow the user to operate the shade locally, and include functions such as, for example, capacitive touch control, user "bump" gesture control, object in path detection, auto-programming modes and the like. A user control system may be built directly into the bottom rail, a so-called "smart rail", or it may be an independent unit such as operating and hand held remote control 152 that can be docked to and detached from the bottom rail, allowing remote use. The remote control user input device can operate when docked to the bottom rail, or when and held or resting away from the docking location. While the docking location can be on the shade itself, typically in the bottom rail, the docking location also can be a holder located at some other location, such as on the window frame or wall adjacent the shade, such as shown in FIG. 1.

As the window covering travels to its directed position, a control system monitors data from various sources (accelerometer, I.R. detection, sonic feedback, etc.) to decide whether a foreign object exists in the intended path of travel. This system will stop the shade at or prior to the object, thereby protecting the shade from damage and the object from harm. Various methods of object detection can be used. For example, a three axis accelerometer measuring physical movement can be paired with an infrared emitter/detector combination that measures objects at a distance exceeding five inches.

When a portable, hand-held controller is provided, such as hand held remote control 152, the window covering can be placed in a programming mode, and "taught" to stop when the bottom rail is at the same elevation as the controller. This simple adjustment method enables the user to simply activate the programming mode and then hold the controller at the desired level for opening or closing the window covering, whereby the control system learns to stop at that position. Thereafter, unless reprogrammed, this will remain the limit of travel. It should be understood that a series of stop positions rather than a single stop position also can be established in this way.

By utilizing ultrasonic sound waves, the position of the bottom rail in relation to any obstacle beneath it, including the window sill, as well as in relation to the headrail above it can be determined. The distance is transmitted to the window covering lift system printed circuit board 162 via RF signal. The distance is measured by transmitting a specific sound frequency, at a specific power, receiving the signal rebound, and measuring the time lapse. The calculated position can be used to provide numerous functions.

The ultrasonic positioning system can provide a method of locating the lower limit of travel by determining the distance to the first object sensed. The detection cone is determined via software. The angle of detection and sound intensity may be tuned for individual situations. In this mode, the window covering will function properly without any prior configuration by the user if the window covering is preconfigured to cease travel a specified distance from the first object detected, which can be a window sill if no intermediate object is present. Without programming by the user, the window covering will stop automatically at the predetermined distance from the window sill.

When the window covering receives a command to 'travel', a second RF signal triggers the bottom rail system to wake up and begin transmitting sensor output. If a condition is met where an obstacle is detected in the path of travel, the window covering will respond with an appropriate response, such as terminating movement. The bottom rail will end travel when the bottom rail approaches a specified minimum distance from the object. This distance may be adjusted by the user to control how close the bottom rail will travel to the object or window sill. This adjustment may be provided in the form of a small adjusting screw hidden in the bottom rail. Alternatively, adjustment can be an electronic adjustment of the distance.

The use of ultrasonic sensing allows for different window covering mount configurations. The sensors detect anything inside a configurable detection cone. The angle and intensity of the cone may be adjusted to allow for different detection models. When a window covering is mounted as an inside mount, the ultrasonic sound wave is directed vertically below the bottom rail, so as to detect the window sill below, or any foreign object in the path of travel, such as, for example, a window crank.

When the window covering is mounted in an outside mount configuration, the ultrasonic sensor is still directed vertically beneath the bottom rail. However, adjustment of the cone angle allows for detection behind the window covering. As the bottom rail approaches the sill below, the detection cone will begin to see the sill behind the window covering. The larger the detection cone, the greater the distance can be between the bottom rail and the window sill behind when detection occurs. The distance is a function of the cone angle. At a detection angle of 30-degrees, the sensor can detect the window sill 2.5" inches (about 6.4 cm) behind the bottom rail when the bottom rail is at 10 inches (25.4 cm) vertically from the sill.

Other design options for distance measurement also can be used. By utilizing infrared emitting diodes and IR receptors, the detection of an object in the path of travel may also be realized. When the IR receiver detects reflected light of a specific wavelength, an object has been detected, and the controls may respond with the appropriate command.

The use of infrared, ultrasonic or other position detection systems provide protection against product failure. When a motorized window covering encounters an obstacle in its normal path of travel, and continues its motion, product failure is likely to occur due to over-spooling of the lift cord. The design disclosed herein utilizes a detection system, such as ultrasonic detection or IR detection to eliminate this concern. During travel, if the window covering encounters an unexpected obstacle within the normal path of travel, the window covering will cease travel until the object is removed and the window covering can continue as normal. This will reduce over-spooling, which in turn will decrease product returns, thus increase overall customer satisfaction.

An exemplary arrangement is shown in FIG. 4, wherein a window covering 500 having a bottom rail 502 and window covering material 504 is shown. A transceiver 506 is included in a printed circuit board in bottom rail 502 along with sensors and devices to provide added functions. During initial command to travel, a signal is sent from a motor control transceiver on printed circuit board 162 to the bottom rail slave transceiver to wake up and initialize onboard sensors. Multiple sensor options can be built into the system. For example, an IR or sonic emitter/detector 506 can be included in bottom rail 502, and can be used to detect the position of the bottom rail relative to a window sill 508, and/or to detect objects in the path of the window covering as it is being lowered, so as to avoid contact with the object by stopping travel of bottom rail 502 before damage can occur to window covering 500 or any object in the path of travel A bottom rail sensing board also can be configured with a multi-axis accelerometer IC. This sensor measures rate of displacement from a fixed home position. When activated by the master motor control transceiver, this system measures the angle at which the bottom rail is sitting in relation to the earth below. The tilt measurement provides conditions for multiple user functions by pushing, pulling, lifting or pressing the rail to a different relative position. However, the multi-axis accelerometer also can provide an additional safety factor against damage.

Figure 42:
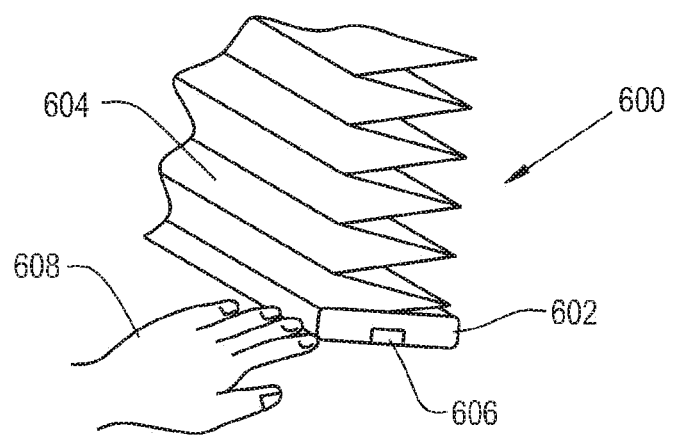
FIG. 42 is a fragmentary perspective view of still another window covering on a FIG. 43 is a fragmentary perspective view of a further window covering on a window.

As shown in FIG. 42, a window covering 600 has a bottom rail 602 and window covering material 604. An accelerometer 606 is included in a printed circuit board in bottom rail 602. A user 608 can manually alter the position of bottom rail 602, such as by pushing to generate a signal for lowering the window covering or slight lifting to instigate raising the window covering. Movement can continue until a pre-designated next stop position is reached, or until another manual disruption is applied. Alternatively, operation can be in predetermined increments, with the user instigating a sufficient number of taps or disruptions for the desired number of incremental movements to reach the desired final position. For safety purposes, if the window covering encounters a foreign object in the normal path of travel, which was not detected by the ultrasonic, IR or other sensors, the object will modify the normal path of travel followed by the window covering. The change in travel path, or tilt, will be detected by the accelerometer, and protective action can be taken. In such conditions, a signal can sent to the master printed circuit board 162 with instructions to cease all movement; cease downward movement, reverse direction and travel to the upper limit; or cease downward movement, reverse direction and travel until tilt is no longer detected. In this way, the window covering also can be made to be self-leveling.

The use of an accelerometer can distinguish between an object in the path of travel, and a specific method of contact from the user. For example, if a certain sequence of 'taps' is detected, the window covering will respond with the associated command. For example, two consecutive taps can be used to command the window covering to stop motion, another two tap to command the window covering to change directions and travel to the associated limit. Such input also can be used for programming upper and lower travel limits for standard operation of the window covering.

A bottom rail printed circuit board can be configured also with a magnetic positioning system. By utilizing magnets positioned on the window sill, molding, adjacent wall etc, an infinite number of 'intermediate' stop positions can be realized. Multiple window coverings may be generically synchronized to stop at the same positions by placing the required number of magnets at the desired stop positions. The printed circuit board located within the bottom rail can include a sensor that detects certain levels of magnetic flux. A condition is determined according to the amplitude of the magnetic field imparted on the sensor. The sensor can consist of magnetic reed switches, hall sensors, or a combination of both. The sensitivity of the sensor may be adjusted to account for various mount configurations and sensor positions. Small form factor dense field magnets will be supplied to the customer to attach to the window, as needed. The magnets may be removed or adjusted without damage to the window sill.

A motion sensing IC is capable of sensing and responding to specific gesture movements made by the user. The bottom rail can utilize this technology. Sensing windows can be included into the bottom rail. Gestures made in view of these windows can be processed and compared to pre-determined learned commands, allowing a user to control the window covering within a determined field, by simple bodily gestures without physical contact with the window covering itself. Ability to distinguish between specific gestures allows the user to provide a different gesture for each specific command. A gesture sensing module may also be utilized in a local wall mount controller (wall switch) instead of the bottom rail. For example, upward gestures, downward gestures, circular gestures or the like can be used as commands to the system to perform certain actions.

Figure 43:
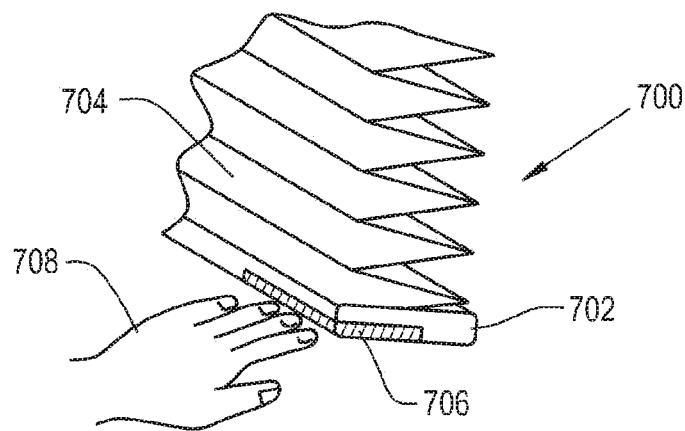
FIG. 43 is a fragmentary perspective view of a further window covering on a window.

A capacitive touch control unit built into the bottom rail printed circuit board allows for user interface on the window covering itself. Multiple capacitive sense pads placed on the front and bottom of the bottom rail will provide the user with complete control of the window covering without the need for an RF link. The nature of capacitive touch controls is such that the components required can be concealed within an acceptable aesthetic design for the window covering. For example, the capacitive touch control unit can be provided in a readily accessible location of the bottom rail or bottom rail of the window covering, such as along the bottom at one end of the bottom rail, FIG. 43 shows a window covering 700 having a bottom rail 702 and window covering material 704. A capacitive touch sensing pad 706 is provided in bottom rail 702.

Handheld remote control user input device 152 can be a simple, intuitive one-one radio frequency control unit. The radio control ("RC") utilizes a minimal button design, having only what buttons are needed to operate a single local window covering. The RC can be linked to the host window covering during the manufacturing process, thus eliminating the need for any confusing linking steps to be performed by the consumer. The system can incorporate many options which may be built in or scaled back as necessary for the scope of the product. The basic system includes a small form factor, two button, tactile based design, with minimal user function, such as simple up/down movement commands with minimal light or audible window covering feedback.

An improved design for the user input device can include a small dual stack motherboard/daughterboard capacitive or resistive touch design. The system will operate for three or more years on a 20 mm lion coin cell, even without the previously described photovoltaic recharging system. While the exemplary embodiment shown includes two operating buttons, it should be understood that a simple, one button device also can be used wherein successive activations of the single button switch causes the motorized lift assembly 120 to start and stop operation on an alternating basis.

Many of the features described above for using in a bottom rail also can be included in improved versions of the handheld remote control user input device. An accelerometer and/or infrared and/or capacitive touch control system embedded into the bottom rail system detailed above also can be utilized in the remote control user input device to allow for the same operation of the functions detailed above. This system also will allow the user to 'dock' or simply clip the remote control user input device to the bottom rail of the window covering, and configure it in a specified mode to allow for local user function and window covering positioning. This will allow the remote control user input device to become different types of controls, depending on which mode is enabled on the remote control user input device. For examples and not limitation, through appropriate activation the user input device can become any of the following types of controls, as described previously; a physical bump user gesture control using an accelerometer, a contactless gesture control with a motion sensing IC, a foreign object detection system using IR or sonic sensors and/or an accelerometer, and/or an automated and self-programming window size fitting unit using the IR and/or sonic sensors.

The infrared detector/emitter combination mounted so that it is windowed through the housing will allow for incoming hand detection from approximately five inches away. This detection mode is available with the remaining system in a sleep mode, with 7 uA current draw. This will allow the remote control user input device system to wake and give feedback (light language) to the user before actually contacting the control source. This feature will also serve several purposes in that it may be mounted or generically fastened to the bottom surface of the window covering bottom rail, allowing for the self-programming feature discussed above.

The system can provide multiple RF remote control options. One option in particular is specified as a small form remote that can be easily adhered to the window sill or molding. This small form factor remote serves as a local RF control station for the window covering, and in a multiple window installation a separate small form remote can be provided for each individual window covering. If mounted on or near the window covering that it operates, it effectively substitutes for a conventional operating cord to operate one and only one window covering. A simple interface will provide the user with controls for (and not limited to) all motion. The small form remote also may serve as a docking station for the handheld remote control.

Figure 44:
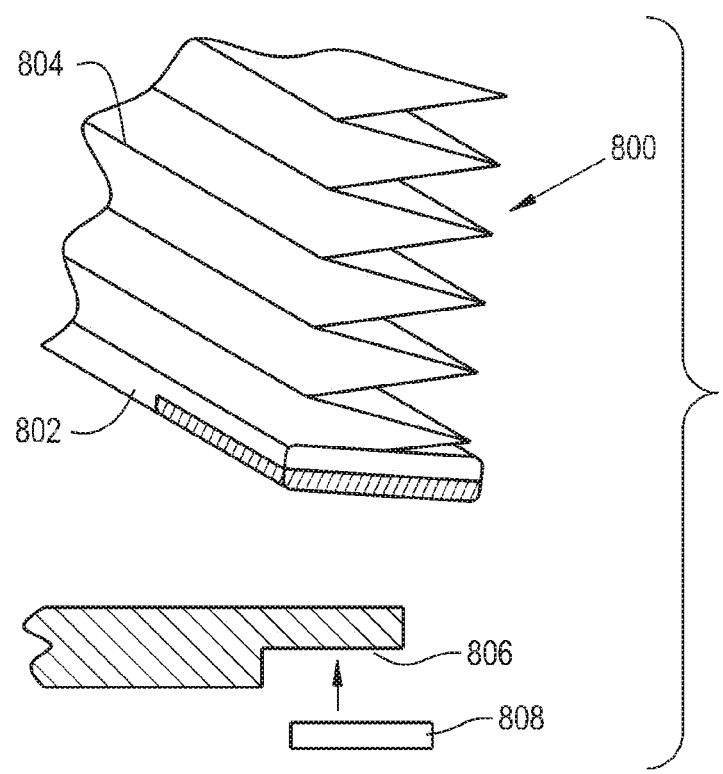
FIG. 44 is a fragmentary perspective view of a still further window covering on a window.

The remote control user input device may be implemented as a passive mounting dock for a multi-window covering remote. The bottom rail may include a socket or dock to allow the remote control user input device to be placed and held in it, as shown in FIG. 44. A window covering 800 includes a bottom rail 802 and window covering material 804. A receiver or socket 806 in bottom rail 802 is configured to receive and retain a remote control user input device 808. With the controls facing out on remote control user input device 808, operation of the remote control user input device can continue even while it is docked in the bottom rail.

Still other variations and uses are possible. Common motorized controls are found in the headrails of window coverings. With the systems disclosed herein, which are both lightweight and compact, the drive and control mechanisms can be located in the bottom rail of the window covering. In such a system, the lift cords are fixed at the upper end in the headrail, and winding mechanisms are provided in the bottom rail to "walk up" the lift cord by winding from the bottom when raising the window covering.

Photovoltaic cells can be provided on the bottom rail or other locations to power a battery charging system. The system described herein requires very little current to operate in 'stand-by' mode, as little as 4 uA. This allows the system to operate for several years on a standard coin cell. However, film technology solar cells may be implemented to eliminate the need for batteries. The combination of micro-current consuming sleep modes, short operating duty cycles, and specific battery design allow the entire automated window covering system to be powered indefinitely by means of solar power. Film style solar panels can be used in the design of the fixture to provide operational current when necessary, and to supply a battery charging circuit when in standby for the mechanical life of the window covering. Ambient room lighting coupled with intermittent solar radiation can provide the needed current to operate the system, including any operating and control device and the window covering motor The control system for the window covering may be linked with a home personal computer, allowing window covering status data to be sent via internet. This information can be used to assist a customer service team in troubleshooting the product in the field. Linking to a smartphone or other portable unit can allow a home owner to monitor or control operation from distant locations.

To avoid complexity for the end-user, the window covering system can employ an automated method for configuring the window covering to fit the opening it is mounted in or on. This system can use a method of detection similar to that described above for object detection. Alternatively or conjunctively, the "Remote control user input device" control unit can be used as a virtual marker placed at the desired limit of movement, so that programming will establish that limit as the stop point for raising or lowering the window covering.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A gear train comprising:
a plurality of speed reducing planetary gear stages, at least one gear stage including a planet gear carrier having:
a support surface;
a plurality of legs projecting from a first side of the support surface; and
a sun gear projecting from a second side of the support surface, opposite the first side,
wherein each leg includes a laterally projecting foot positioned at an end distal the support surface, and
wherein each leg includes a sloped surface.

2. The gear train of claim 1, wherein the sloped surface is positioned at the end distal the support surface.

3. The gear train of claim 2, wherein the sloped surface defines a thinner region of each leg.

4. The gear train of claim 3, wherein the thinner region of each leg increases in thickness from the end distal the support surface towards an end proximal the support surface.

5. The gear train of claim 1, wherein the sloped surface is positioned on a side of each leg opposite the laterally projecting foot.

6. The gear train of claim 1, wherein each leg includes a collar, the collar being spaced from the laterally projecting foot.

7. The gear train of claim 6, wherein the collar at least partially surrounds the corresponding leg.

8. The gear train of claim 6, wherein each leg is configured to receive a planetary gear, the planetary gear being positioned between the collar and the laterally projecting foot.

9. The gear train of claim 1, wherein the second side of the support surface includes a sloped surface that extends radially outward from the sun gear.

10. A planet gear carrier comprising:
a support surface; and
a plurality of legs projecting from a first side of the support surface,
wherein each leg includes a laterally projecting foot positioned at an end distal the support surface, and
wherein each leg includes a sloped surface.

11. The planet gear carrier of claim 10, wherein the sloped surface is positioned on a side of each leg opposite the laterally projecting foot.

12. The planet gear carrier of claim 10, wherein the sloped surface defines a thinner region of each leg.

13. The planet gear carrier of claim 12, wherein the sloped surface is positioned at the end distal the support surface, the thinner region of each leg increases in thickness along the sloped surface from the end distal the support surface towards an end proximal the support surface.

14. The planet gear carrier of claim 10, wherein each leg includes a collar, the collar being spaced from the laterally projecting foot, each leg being configured to receive a planetary gear, the planetary gear being positioned between the collar and the laterally projecting foot.

15. The planet gear carrier of claim 10, further comprising a sun gear projecting from a second side of the support surface, opposite the first side.

16. The planet gear carrier of claim 10, further comprising a boss projecting from a second side of the support surface, opposite the first side.

17. The planet gear carrier of claim 16, wherein the boss defines an axial hole extending through the boss and the support surface.

18. The planet gear carrier of claim 17, further comprising a shaft received by the axial hole, a portion of the shaft extending through the support surface.

* * * * *